(12) United States Patent
Kang et al.

(10) Patent No.: US 10,997,935 B2
(45) Date of Patent: May 4, 2021

(54) DISPLAY DEVICE

(71) Applicant: SAMSUNG DISPLAY CO., LTD., Yongin-si (KR)

(72) Inventors: Jae Woong Kang, Jeonju-si (KR); Seung Hwan Park, Anyang-si (KR); Cheol Woo Park, Suwon-si (KR); Dong Gyu Lee, Seoul (KR); Yong Jun Jang, Yongin-si (KR); Young Soo Hwang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 737 days.

(21) Appl. No.: 15/668,010

(22) Filed: Aug. 3, 2017

(65) Prior Publication Data

US 2018/0061341 A1 Mar. 1, 2018

(30) Foreign Application Priority Data

Sep. 1, 2016 (KR) .................. 10-2016-0112717

(51) Int. Cl.
*G09G 5/02* (2006.01)
*G09G 3/36* (2006.01)
(Continued)

(52) U.S. Cl.
CPC ..... *G09G 3/3648* (2013.01); *G02F 1/133514* (2013.01); *G02F 1/133528* (2013.01); *G02F 1/134309* (2013.01); *G09G 3/2003* (2013.01); *G09G 3/3406* (2013.01); *G09G 3/3685* (2013.01); *G02F 1/136286* (2013.01); *G02F 2001/133548* (2013.01); *G02F 2001/133614* (2013.01); *G02F 2201/121* (2013.01); *G09G 2320/0233* (2013.01);
(Continued)

(58) Field of Classification Search
CPC .. G09G 3/3648; G09G 3/3685; G09G 3/3406; G09G 3/2003; G09G 2320/043; G09G 2320/0242; G09G 2320/0233; G09G 2320/041; G09G 2300/0233; G09G 2300/0242; G09G 2300/041; G09G 2300/043; G02F 1/133514; G02F 1/134309; G02F 1/133528; G02F 1/136286; G02F 2001/133614; G02F 2201/121; G02F 2001/133548; G02F 2001/121
See application file for complete search history.

(56) References Cited

U.S. PATENT DOCUMENTS 8,264,638 B2 9/2012 Jung et al.
8,582,057 B2 11/2013 Jung et al.
(Continued)

FOREIGN PATENT DOCUMENTS

KR 10-2008-0073907 A 8/2008
KR 10-2010-0090570 A 8/2010

*Primary Examiner* — Joe H Cheng
(74) *Attorney, Agent, or Firm* — Kile Park Reed & Houtteman PLLC

(57) ABSTRACT

A display device including a first substrate, a color conversion layer on the first substrate and containing a wavelength conversion material, a first conductive polarizer on the color conversion layer, and a timing controller electrically connected to the first conductive polarizer. The timing controller may measure a resistance of the first conductive polarizer to generate a compensation signal based on the measured resistance.

22 Claims, 17 Drawing Sheets

(51) Int. Cl.
 *G02F 1/1335* (2006.01)
 *G02F 1/1343* (2006.01)
 *G09G 3/34* (2006.01)
 *G09G 3/20* (2006.01)
 *G02F 1/1362* (2006.01)
 *G02F 1/13357* (2006.01)

(52) U.S. Cl.
 CPC ............... *G09G 2320/0242* (2013.01); *G09G 2320/041* (2013.01); *G09G 2320/043* (2013.01)

(56) References Cited

U.S. PATENT DOCUMENTS

| | | | |
|---|---|---|---|
| 2011/0122057 A1* | 5/2011 | Kim | G09G 3/3426 345/102 |
| 2013/0093706 A1* | 4/2013 | Kurasawa | G06F 3/044 345/173 |
| 2014/0035466 A1* | 2/2014 | Lee | H05B 33/0854 315/152 |
| 2015/0331278 A1 | 11/2015 | Araki et al. | |
| 2016/0033823 A1* | 2/2016 | Lee | G02F 1/133617 349/71 |
| 2016/0161812 A1* | 6/2016 | Kim | G02F 1/136204 349/58 |

* cited by examiner

DISPLAY DEVICE

CROSS-REFERENCE TO RELATED APPLICATION

Korean Patent Application No. 10-2016-0112717, filed on Sep. 1, 2016, in the Korean Intellectual Property Office, and entitled: "Display Device," is incorporated by reference herein in its entirety.

BACKGROUND

1. Field

The present disclosure relates to a display device.

2. Description of the Related Art

A liquid-crystal display (LCD) device includes two substrates on which field generating electrodes such as a pixel electrode and a common electrode are formed, and a liquid-crystal layer disposed therebetween. An LCD device displays an image in such a manner that voltage is applied to field generating electrodes to generate electric field across a liquid-crystal layer, and liquid-crystal molecules in the liquid-crystal layer are aligned by the electric field so as to control the polarization of incident light.

Among such LCD devices, a vertically aligned (VA) mode LCD, in which liquid-crystal molecules are oriented such that their major axes are perpendicular to the upper and lower display panels when no electric field is applied, is attracting attention since it has large contrast ratio and is easy to achieve wide viewing angle.

SUMMARY

One or more embodiments provides a display device including a first substrate, a color conversion layer on the first substrate and containing a wavelength conversion material, a first conductive polarizer on the color conversion layer; and a timing controller electrically connected to the first conductive polarizer. The timing controller may measure a resistance of the first conductive polarizer to generate a compensation signal based on the measured resistance.

One or more embodiments provides a display device including a first substrate including a display area and a non-display area surrounding the display area, a timing controller in the non-display area, a second substrate facing the second substrate, a color conversion layer including a wavelength conversion material, and a first conductive polarizer on the color conversion layer and electrically connected to the timing controller. The timing controller may measure a resistance of the first conductive polarizer and generates a compensation signal based on the measured resistance.

One or more embodiments provide a device including a first substrate, a color conversion layer on the first substrate and containing a wavelength conversion material, a plurality of first conductive lines overlapping the color conversion layer, a timing controller electrically connected to the plurality of first conductive lines to measure a resistance of the first plurality of first conductive lines to generate a compensation signal based on the measured resistance, a light source to provide light to the color conversion layer, and a light source controller to provide a dimming signal to the light source. The timing controller may provide the compensation signal to the light source controller. The light source controller may adjust an amount of light output by the light source based on the compensation signal.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
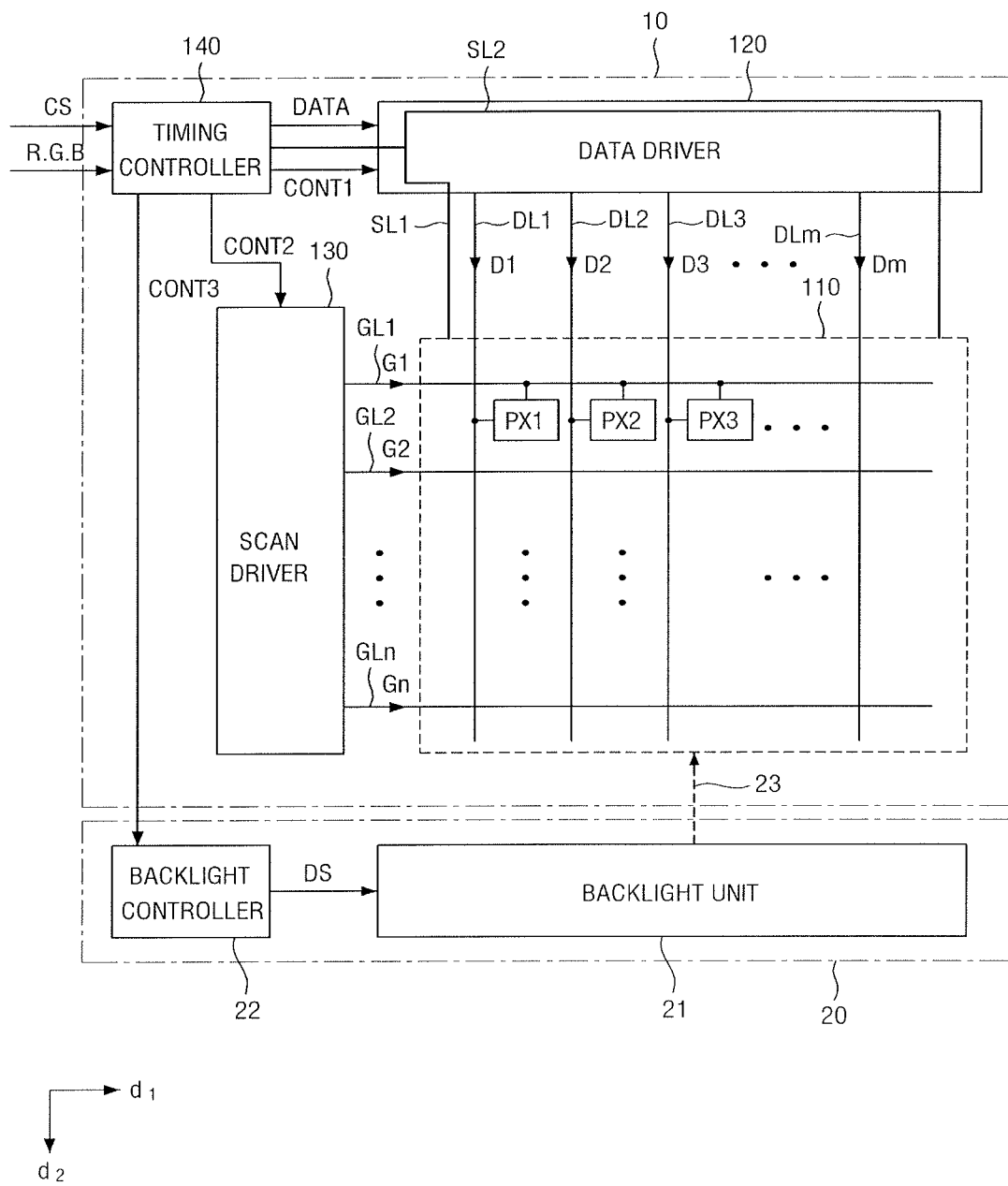
FIG. 1 illustrates a block diagram of a display device according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

FIG. 1 is a block diagram of a display device according to an exemplary embodiment of the present disclosure. Referring to FIG. 1, the display device according to the exemplary embodiment of the present disclosure may include a display panel 10 and a backlight module 20. The display panel 10 may include a display section 110, a data driver 120, a scan driver 130 and a timing controller 140.

The display section 110 may be a panel displaying images thereon. The display section 110 may include a first plate 200, a second plate 300 facing the first plate 200. and a liquid-crystal layer 400 interposed therebetween (see FIG. 3). That is, in an exemplary embodiment, the display section 110 may be a liquid-crystal panel.

The display section 110 may be connected to the scan driver 130 via first to $n^{th}$ scan lines GL1 to GLn, where n is a natural number equal to or greater than one. In addition, the display section 110 may be connected to the data driver 120 via first to $m^{th}$ data lines DL1 to DLm, where m is a natural number equal to or greater than one. The display section 110 may include a plurality of pixels including first to third pixels PX1 to PX3. Each of the plurality of pixels may be electrically connected to one of the first to $n^{th}$ scan lines GL1 to GLn and one of the first to $m^{th}$ data lines DL1 to DLM.

The first to $n^{th}$ scan lines GL1 to GLn may extend in a first direction d1. In addition, the first to $m^{th}$ data lines DL1 to DLm may extend in a second direction d2. In an exemplary embodiment, the first direction D1 may intersect the second direction D2. In FIG. 1, the first direction d1 refers to the row direction and the second direction d2 refers to the column direction.

The first to third pixels PX1 to PX3 may be arranged adjacent to another. As used herein, the phrase that a first element is adjacent to a second element means that no identical third element is disposed between the first element and the second element. In an exemplary embodiment, the first to third pixels PX1 to PX3 may be arranged one adjacent to another in the first direction d1. However, the arrangement of the pixels is not limited to that shown in FIG. 1. For example, the first to third pixels PX1 to PX3 may be arranged one adjacent to another in the second direction d2.

In an exemplary embodiment, the first to third pixels PX1 to PX3 may represent different colors. In an exemplary embodiment, the first pixel PX1 may represent red. In an exemplary embodiment, the second pixel PX2 may represent green. In an exemplary embodiment, the third pixel PX3 may represent blue. The first to third pixels PX1 to PX3 may be electrically connected to the first scan line GL1. Accordingly, the first to third pixels PX1 to PX3 may be operated simultaneously in accordance with a first scan signal G1 supplied from the first scan line GL1. This will be described below in more detail with reference to FIG. 2.

The data driver 120 may include a shift register, a latch, a digital-to-analog converter (DAC), etc. The data driver 120 may receive a first control signal CONT1 and image data DATA from the timing control unit 140. The data driver 120 may select a reference voltage in accordance with the first control signal CONT1 and may convert the received image data DATA in the form of a digital wave into first to $m^{th}$ data signals D1 to Dm based on the selected reference voltage. The data driver 120 may provide the generated data signals D1 to Dm to the display section 110.

The scan driver 130 may receive a second control signal CONT2 from the timing controller 140. The scan driver 130 may provide a plurality of scan signals G1 to Gn to the display section 110 in accordance with the received second control signal CONT2.

The timing controller 140 may receive image signals R, G and B and a control signal CS from an external device. In an exemplary embodiment, the control signal CS may include a vertical synchronous signal, a horizontal synchronous signal, a main clock signal, a data enable signal, etc. The timing controller 140 may process the signals received from an external device so that they are suitable for the operating conditions of the display section 110, and then may generate the image data DATA, the first control signal CONT1 and the second control signal CONT2. The first control signal CONT1 may include a horizontal synchronous start signal to instruct to start inputting the image data DATA and a load signal for controlling application of the first to $m^{th}$ data signals D1 to Dm to the first to $m^{th}$ data lines DL1 to DLm. respectively, etc. The second control signal CONT2 may include a scan start signal to instruct to start outputting the first to $n^{th}$ gate signals G1 to Gn, and a gate clock signal for controlling the output timing of scan-on-pulses, etc.

The backlight module 20 may include a backlight unit 21 and a backlight controller 22. The backlight unit 21 may receive a dimming signal DS from the backlight controller 22. The backlight unit 21 may generate light 23 based on the received dimming signal DS to provide it to the display panel 10. The backlight unit 21 may include a plurality of light source blocks. Detailed description thereof will be made below. The backlight controller 22 may receive a third control signal CONT3 from the timing controller 140. The backlight controller 22 may generate the dimming signal DS based on the received third control signal CONT3 to provide it to the backlight unit 21.

Figure 5:
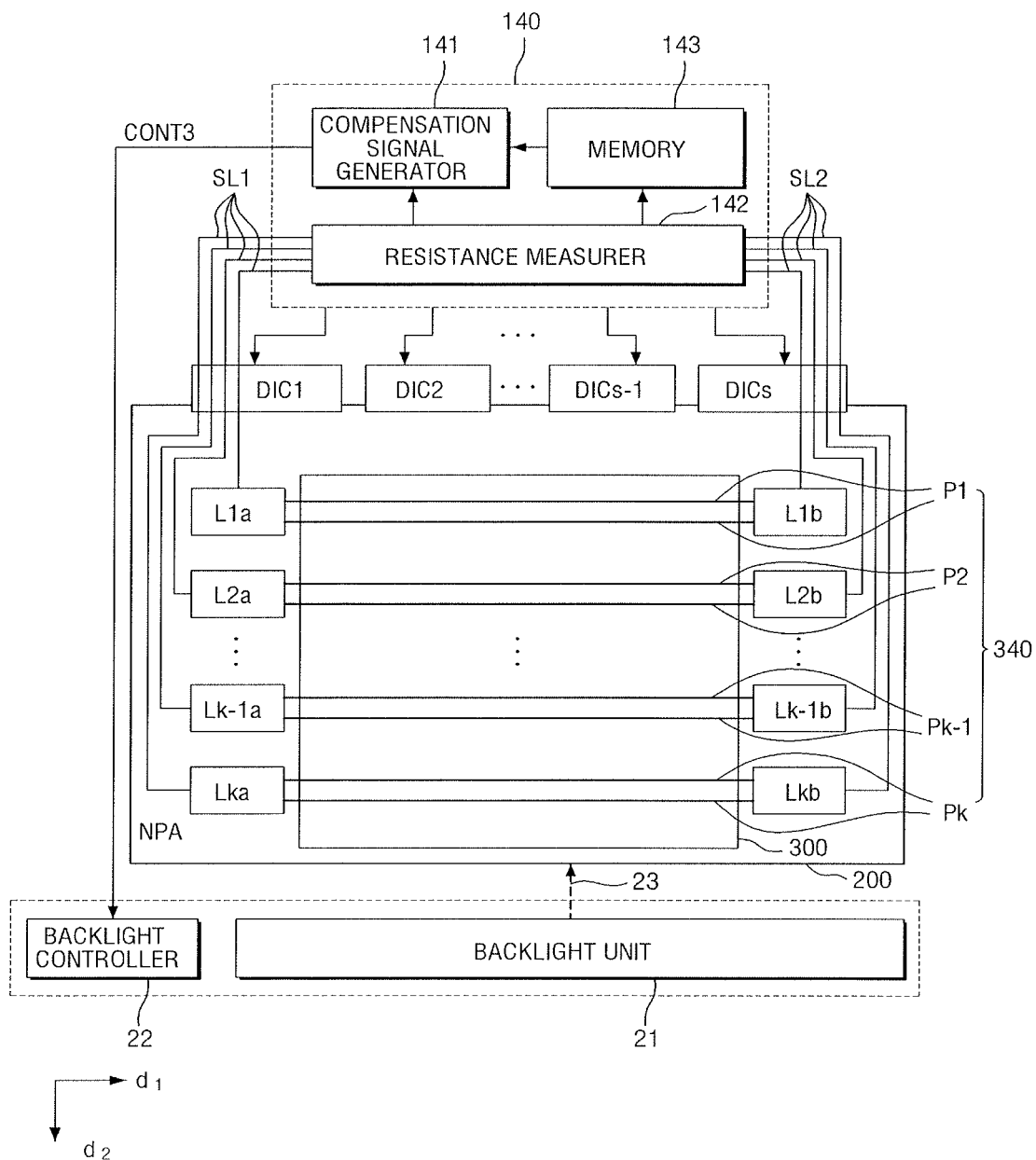
FIG. 5 illustrates a block diagram of an operation of a display device according to an exemplary embodiment of the present disclosure.

The timing controller 140 may be connected to the display section 110 via a first sensing line SL1 and a second sensing line SL2 (see, e.g., FIG. 5). More specifically, the timing controller 140 may be connected to a second polarizer 340, e.g., including a plurality of metal wire patterns 341 of FIG. 3, via the first sensing line SL1 and the second sensing line SL2, which will be described below. The timing controller 140 may measure the resistance of the second polarizer 340 via the first sensing line SL1 and the second sensing line SL2, and may generate a compensation signal based on the measured resistance to be provided to the backlight controller 22. That is, the third control signal CONT3 may include the compensation signal. The backlight controller 22 may receive the third control signal CONT3 including the compensation signal and may adjust a duty ratio of the dimming signal DS based on the received third control signal CONT3. That is, the backlight controller 22 may control the amount of light emitted from the backlight unit 21 by adjusting the duty ratio of the dimming signal DS. Detailed description thereof will be made below.

In an exemplary embodiment, the first sensing line SL1 and the second sensing line SL2 may be connected to the timing controller 140 via the data driver 120. However, this is merely illustrative. For example, the first sensing line SL1 and the second sensing line SL2 may be formed as separate lines so that they are connected to the timing controller 140 without passing through the data driver 120. Each of the first sensing line SL1 and the second sensing line SL2 may collectively refer to a plurality of sensing lines or may refer to a single sensing line. More detailed description thereon will be made below with reference to FIG. 3.

Figure 2:
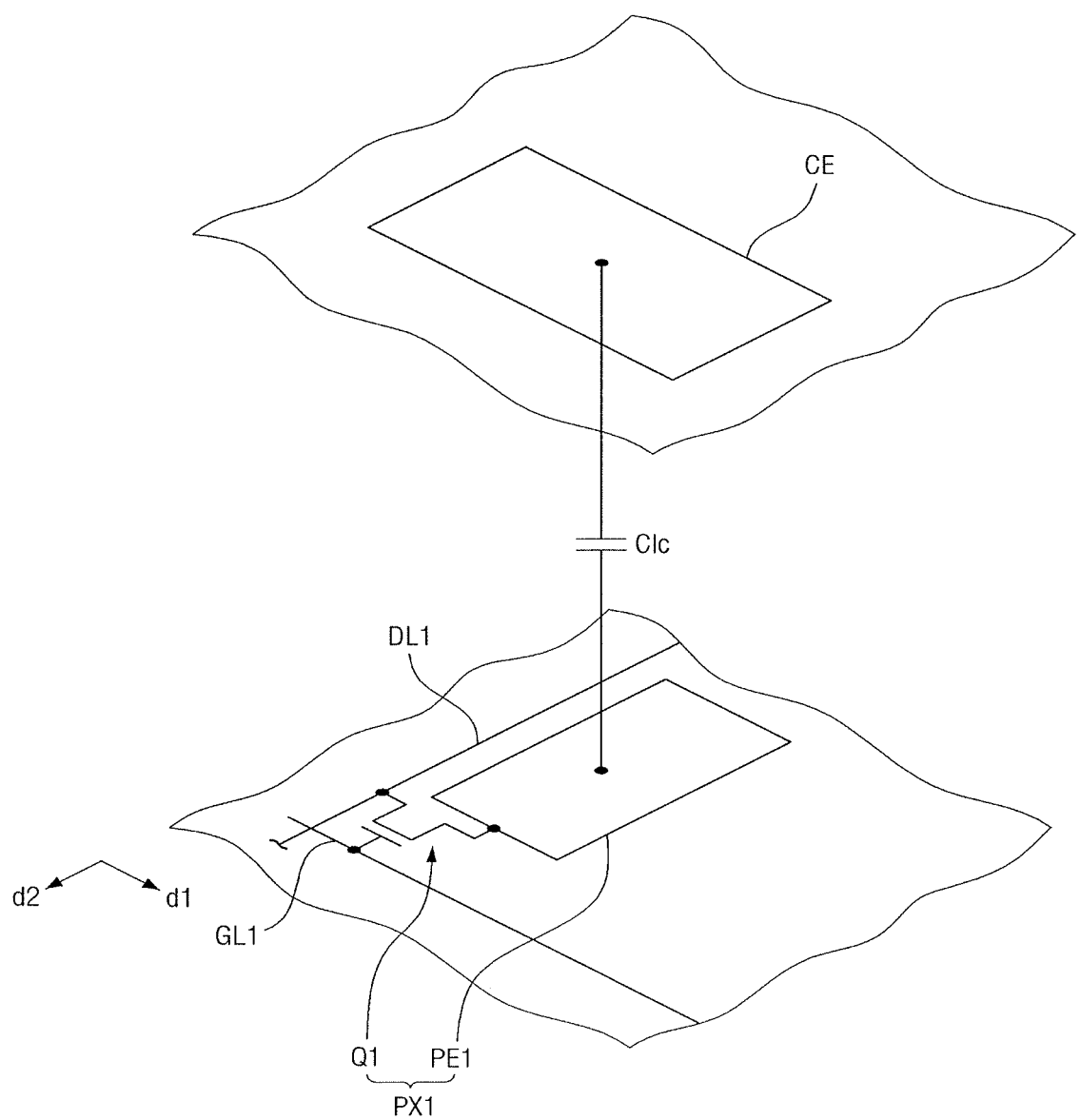
FIG. 2 illustrates a view showing an example of a first pixel among the elements of the display device shown in FIG. 1.

FIG. 2 is a view showing an example of a first pixel among the elements of the display device shown in FIG. 1. FIG. 2 illustrates the first pixel PX1 among the first to third pixels PX1 to PX3. Referring to FIG. 2, the first pixel PX1 may include a first switching element Q1 and a first pixel electrode PE1.

In an exemplary embodiment, the first switching element Q1 may be an element having three terminals, e.g., a thin-film transistor. In the following description, the switching element is assumed to be a thin-film transistor. A control electrode of the first switching element Q1 may be electrically connected to the first scan line GL1, a first electrode of the first switching element Q1 may be electrically connected to the first data line DL, and a second electrode of the first switching element Q1 may be electrically connected to the first pixel electrode PE1.

Accordingly, the first switching element Q1 may be turned on upon receiving the first scan signal G1 from the first scan line GL1, and may provide the first data signal D1 received from the first data line DL1 to the first pixel electrode PE1. Although the first pixel PX1 includes only the first switching element Q1 in this exemplary embodiment, this is not limiting. For example, the first pixel PX1 may include two or more switching elements.

Figure 3:
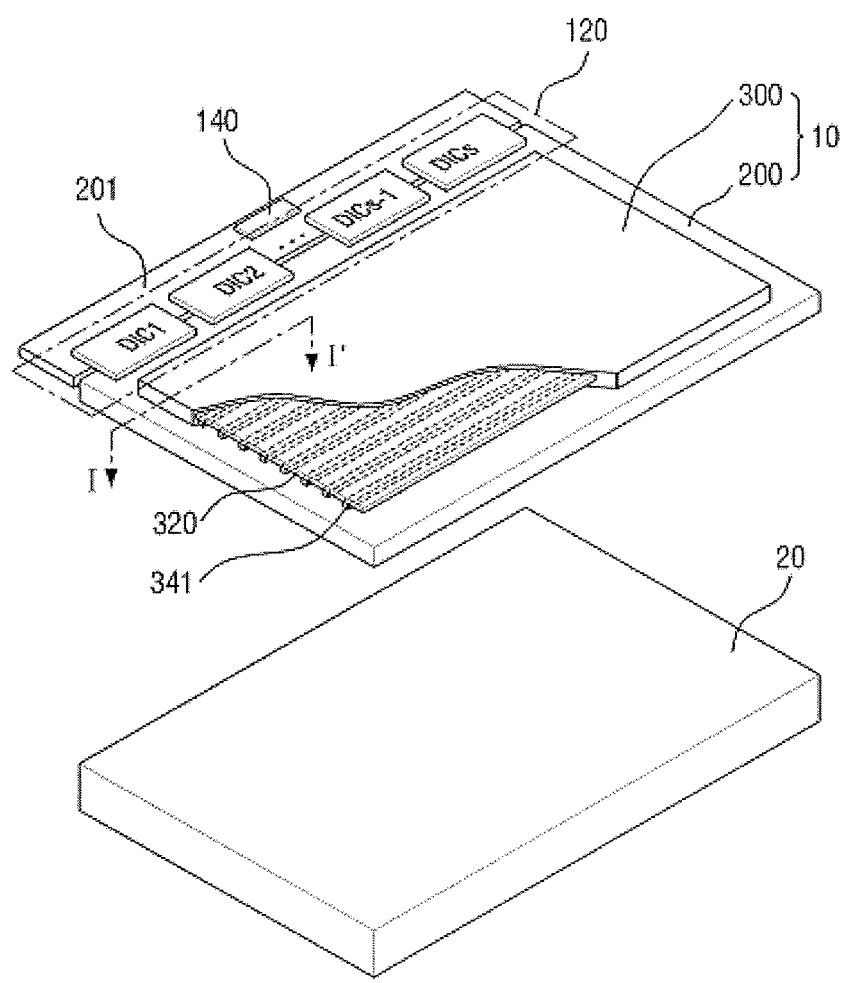
FIG. 3 illustrates a plan view showing some elements of the display device according to an exemplary embodiment of the present disclosure.

The first pixel electrode PE1 may be disposed on the first plate 200 (see FIG. 3). The common electrode CE may be disposed on the second plate 300 (see FIG. 3). The first plate 200 may face the second plate 300. At least a part of the first pixel electrode PE1 may overlap the common electrode CE with respect to the first plate 200, e.g., along a third or stacking direction. Herein, the phrase that an electrode overlaps another electrode refers to that the two electrodes are close enough to each other that capacitive coupling is created therebetween. In the following description, the phrase that an electrode overlaps another electrode refers to that the two electrodes overlap one another in the direction perpendicular to a first substrate 210 to be described below (see FIG. 4).

As the first pixel electrode PE1 and the common electrode CE overlap each other, the first pixel PX1 may further includes a liquid-crystal capacitor Clc between the first pixel electrode PE1 and the common electrode CE. The first pixel PX1 may further include a storage capacitor formed between the first pixel electrode PE1 and a separate storage line.

Figure 4:
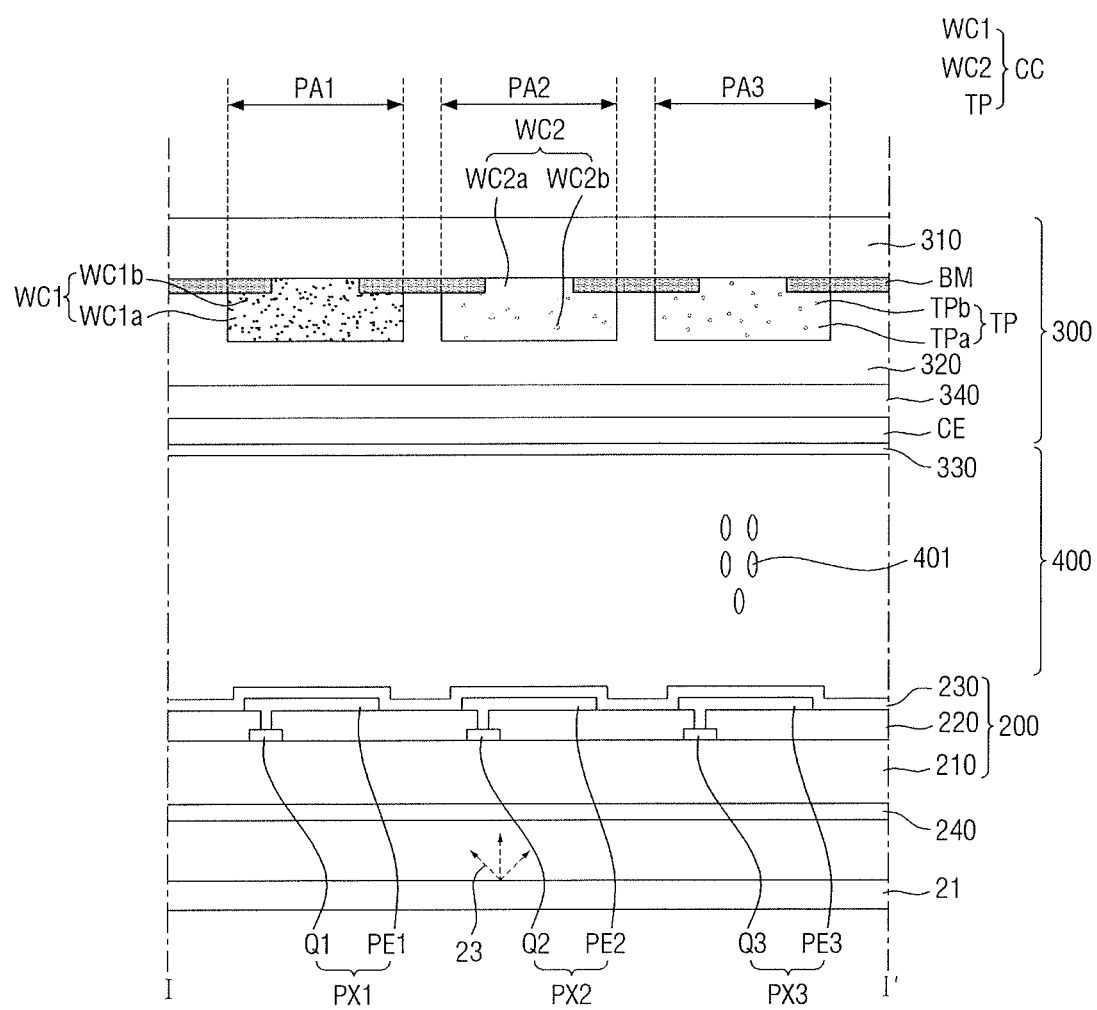
FIG. 4 illustrates a cross-sectional view taken along line I-I' of FIG. 3.

FIG. 3 is a plan view showing some elements of the display device according to an exemplary embodiment of the present disclosure. FIG. 4 is a cross-sectional view taken along line I-I' of FIG. 3. As FIG. 3 shows only some of the elements of the display device according to the exemplary embodiment of the present disclosure, FIG. 3 may not completely match the cross-sectional view shown in FIG. 4. In addition, the elements already described above with respect to FIGS. 1 and 2 will not be described again.

Referring to FIGS. 3 and 4, the display panel 10 may include the first plate 200, the second plate 300, and the liquid-crystal layer 400 interposed therebetween.

The backlight unit 21 may provide light 23 in a specific wavelength range to the display panel 10. In an exemplary embodiment, the light 23 may be in a blue wavelength range. That is, the light 23 may have a single center wavelength that is shorter than the center wavelength of red and the center wavelength of green. In an exemplary embodiment, the light 23 may be blue light having the center wavelength in the range of approximately 400 to 500 nm.

The first plate 200 and the second plate 300 may face each other. The first plate may be closer to the backlight unit 21 than the second plate 300. The liquid-crystal layer 400 may be interposed between the first plate 200 and the second plate 300, and may include a plurality of liquid-crystal molecules 401. In an exemplary embodiment, the first plate 200 and the second 300 may be attached together by sealing.

The first plate 200 will be described first. In an exemplary embodiment, the first plate may include a first substrate 210 that may be a transparent insulation substrate. The transparent insulation substrate may include a glass substrate, a quartz substrate, a transparent resin substrate, etc.

Each of the first to third pixels PX1 to PX3 may be on the first substrate 210, and may include a switching element and a pixel electrode. First to third switching elements Q1 to Q3 may be electrically connected to first to third pixel electrodes PE1 to PE3, respectively.

An insulation layer 220 may be disposed on the first to third switching elements Q1 to Q3. In an exemplary embodiment, the insulation layer 220 may be made of an inorganic insulation material, e.g., silicon nitride, silicon oxide, etc. In another exemplary embodiment, the insulation layer 220 may be made of an organic insulation material. That is, the insulation layer 220 may include an organic material that has a high planarization property and photosensitivity. The insulation layer 220 may cover top and side surfaces of the first to third switching elements Q1 to Q3, other than openings in the insulation layer 220 to connect the first to third pixel electrodes PE1 to PE3 to corresponding first to third switching elements Q1 to Q3

The first to third pixel electrodes PE1 to PE3 may be disposed on the insulation layer 220. In an exemplary embodiment, the first to third pixel electrodes PE1 to PE3 may be made of a transparent conductive material, e.g., indium tin oxide (ITO), indium zinc oxide (IZO), etc., or a reflective metal, e.g., aluminum (Al), silver (Ag), chrome (Cr), or an alloy thereof. The first to third pixel electrodes PE1 to PE3 may overlap the common electrode CE, e.g., may be completely overlapped by the common electrode along the third or stacking direction.

A first wavelength conversion layer WC1 may overlap the first pixel electrode PE1. A second wavelength conversion layer WC2 may overlap the second pixel electrode PE2. A transparent layer TP may overlap the third pixel electrode PE3.

A lower alignment layer 230 may be disposed on the first to third pixel electrodes PE1 to PE3, e.g., may cover side and top surfaces of the first to third pixel electrodes PE1 to PE3. The lower alignment layer 230 may be made of polyimide, etc.

A first polarizer 240 may be disposed under the first substrate 210 in FIG. 4, e.g., between the first substrate 210 and the back light unit 21. The first polarizer 240 may be made of an organic material or an inorganic material. In an exemplary embodiment, the first polarizer 240 may be a reflective polarizer. When the first polarizer 240 is a reflective polarizer, polarization components in parallel with the transmission axis may be transmitted and polarization components in parallel with the reflection axis may be reflected. Alternatively, the first polarizer 240 may be disposed above the first substrate 210. In this case, the first polarizer 240 may be disposed between the first substrate 210 and the first to third switching elements Q1 to Q3.

Next, the second plate 300 will be described. The second plate 300 may include a second substrate 310 that faces the first substrate 210 along the third or stacking direction. The second substrate 310 may be made of transparent glass, plastic, etc., and in an embodiment may be made of the same material as the first substrate 210. The second substrate may be an upper element of the display panel, e.g., an element furthest from the backlight unit 21.

A black matrix BM may be disposed on the second substrate 310 so as to block some light where it is provided, e.g., includes openings therein to allow light for the display output from the first to third pixels PX1 to PX3 to pass therethrough. In an exemplary embodiment, the black matrix BM may be made of an organic material or a metallic material including chrome.

A color conversion layer CC may be disposed on the black matrix BM. The color conversion layer CC may include the first wavelength conversion layer WC1, the second wavelength conversion layer WC2, and the transparent layer TP. As illustrated in FIG. 4, the color conversion layer CC may partially overlap and be between the black matrix BM and the liquid-crystal layer 400. Alternatively, the black matrix BM may partially overlap and be between the color conversion layer CC and the liquid-crystal layer 400. As a further alternative, the color conversion layer CC may correspond to the openings in the black matrix BM, such that they do not overlap along the third or stacking direction.

The first wavelength conversion layer WC1 may overlap the first pixel electrode PE1 in the direction perpendicular to the first substrate 210, e.g., the third or stacking direction. Accordingly, a first pixel area PA1 producing a first color is formed. The first color may be red.

In an exemplary embodiment, the first wavelength conversion layer WC1 may contain a first light-transmitting resin WC1a and a first wavelength-converting material WC1b dispersed in the first light-transmitting resin WC1a. The first wavelength-converting material WC1b converts or shifts the light 23 received from the backlight unit 21 into a light in a first wavelength range. The first color produced by the first pixel area PA1 may be red in a first wavelength range.

The second wavelength conversion layer WC2 may overlap the second pixel electrode PE2 in the direction perpendicular to the first substrate 210, e.g., the third or stacking direction. Accordingly, a second pixel area PA2 producing a second color is formed. The second color may be green.

In an exemplary embodiment, the second wavelength conversion layer WC2 may contain a second light-transmitting resin WC2a and a second wavelength-converting material WC2b dispersed in the second light-transmitting resin WC2a. The second wavelength-converting material WC2b converts or shifts the light 23 received from the backlight unit 21 into a light in a second wavelength range. The second color produced by the second pixel area PA2 may be green in a second wavelength range.

The transparent layer TP may contain a third light-transmitting resin TPa, and a light-scattering material TPb that is dispersed in the third light-transmitting resin TPa and scatters incident light to emit it.

The transparent layer TP may overlap the third pixel electrode PE3 in the direction perpendicular to the first substrate 210. Accordingly, a third pixel area PA3 producing a third color is formed. The third color may be blue in a third wavelength range. That is, in an exemplary embodiment, the backlight unit 21 may provide the blue light 23 in the third wavelength range to the display panel 10.

Each of the first light-transmitting resin WC1a, the second light-transmitting resin WC2a, and the third light-transmitting resin TPa may be made of a transparent material that transmits incident light without converting the wavelength of the incident light. The first to third light-transmitting resin WC1a, WC2a, and TPa may be made of the same material or different materials.

Each of the first wavelength conversion material WC1b and the second wavelength conversion material WC2b may contain quantum dots, quantum rods, phosphor materials, etc. The first and second wavelength conversion materials WC1b and WC2b may absorb incident light to emit light having a center wavelength different from that of the incident light.

The first and second wavelength conversion materials WC1b and WC2b may scatter the incident light on the pixel area PA1 and the second pixel area PA2 in different directions irrespective of incident angles. In addition, the emitted light may be unpolarized, i.e., in an unpolarized state. Herein, an unpolarized light refers to the light that does not consist only of polarization components in a particular direction, e.g., that consists of random polarization components not polarized only in a particular direction. For example, the unpolarized light may be natural light.

The average particle size of the first wavelength conversion material WC that converts the center wavelength of incident light into red wavelength may be larger than the average particle size of the second wavelength conversion material WC2b that converts the center wavelength of the incident light into green wavelength. The first and second wavelength conversion materials WC1b and WC2b may be the same material or different materials.

The light-scattering material TPb may scatter incident light on the third pixel area PA3 in different directions irrespective of the incident angles. The emitted light may be unpolarized, i.e., in an unpolarized state. That is, by using the light transmitting the third pixel area PA3 as scattering light, the characteristics of the lights, other than wavelengths thereof, emitted from all three pixel areas may become similar.

The light-scattering material TPb may have a refractive index different from that of the third light-transmitting resin TPa. For example, the light-scattering material may be organic or inorganic particles, organic-inorganic hybrid particles, particles having hollow structure, etc. In an exemplary embodiment, the organic particles may contain acrylic resin particles or urethane resin particles. In addition, the inorganic particles may contain metal oxide particles, e.g., titanium oxide.

Alternatively, at least one of the first wavelength conversion layer WC1, the second wavelength conversion layer WC2, and the transparent layer TP may be omitted. Further, the arrangement of the first wavelength conversion layer WC1, the second wavelength conversion layer WC2, and the transparent layer TP is not limited to that shown in FIG. 4.

A planarization layer 320 may be disposed on the color conversion layer CC. In an exemplary embodiment, the planarization layer 320 may be made of an organic material. When the first wavelength conversion layer WC1, the second wavelength conversion layer WC2, and the transparent layer TP have different thicknesses, the planarization layer 320 may regulate the heights of the elements stacked on a surface of the second substrate 310, e.g., such that a planar surface abuts the second polarizer 340.

Although the surface of the planarization layer 320 in contact with the color conversion layer CC has a constant height in FIG. 4, this is not limiting. That is, the height of the surface of the planarization layer 320 may vary depending on the height of the color conversion layer CC, the height of the black matrix BM, etc.

The second polarizer 340 may be disposed on the planarization layer 320. As the second polarizer 340 is disposed between the first substrate 210 and second substrate 310, deformation of the second polarizer 340 caused by moisture or heat may be reduced or prevented, and the manufacturing cost may be reduced.

The second polarizer 340 is a conductive polarizer. That is, the polarizer 340 includes a conductive material in which electric current flows. In an exemplary embodiment, the conductive material may include a metal, e.g., aluminum (Al), silver (Ag), gold (Au), copper (Cu), and nickel (Ni). In addition, the conductive material may further include titanium (Ti) and molybdenum (Mo).

In an exemplary embodiment, the second polarizer 340 may be a wire grid polarizer. The second polarizer 340 may include the plurality of metal wire patterns 341 (see FIG. 3). The plurality of metal wire patterns 341 may be arranged on the insulating layer 320 along one direction to form a grid pattern.

When incident light passes through the second polarizer 340, the incident light may be polarized in such a manner that components of the incident light that are parallel to the plurality of metal wires 341 may be absorbed or reflected by the second polarizer 340 and components of the incident light that are perpendicular to the plurality of metal wires 341 may be transmitted through the second polarizer 340. For example, the plurality of metal wires 341 may include a metal such as Al, Ag, Au, Cu, or Ni. For example, the plurality of metal wires 341 may be formed by nano-imprinting.

In an exemplary embodiment, the second polarizer 340 may also include a capping layer on the plurality of metal wires 341. The capping layer may inhibit corrosion of the plurality of metal wires 341.

The common electrode CE may be disposed on the second polarizer 340. The common electrode CE may overlap at least a part of each of the first to third pixel electrodes PE1 to PE3 along the third or stacking direction. In an exemplary embodiment, the common electrode CE may be a single, continuous electrode. In an exemplary embodiment, the common electrode CE may be made of a transparent conductive material such as ITO and IZO or a reflective metal such as Al, Ag, Cr, or an alloy thereof. An upper alignment layer 330 may be disposed on the common electrode CE, e.g., between the common electrode CE and the second polarizer 340. The upper alignment layer 330 may be made of polyimide, etc.

Hereinafter, the liquid-crystal layer 400 will be described. The liquid-crystal layer 400 may include liquid-crystal molecules 401 having dielectric anisotropy and refractive anisotropy. In an exemplary embodiment, the liquid-crystal molecules 410 may be orientated vertically to the first substrate 210 when no electric field is applied to the liquid-crystal layer 400. In an exemplary embodiment, when electric field is formed across the first substrate 210 and the second substrate 310, the liquid-crystal molecules 410 may be rotated or tilted in a particular direction to thereby change polarization of light.

FIG. 5 is a block diagram for illustrating operation of a display device according to an exemplary embodiment of the present disclosure. Referring to FIG. 5, the operation of the display device according to the exemplary embodiment of the present disclosure will be described.

The data driver 120 may include a plurality of source drivers DIC1 to DICs, where s is a natural number equal to or larger than one. Each of the plurality of source drivers DIC1 to DIC2 may be connected to the timing controller 140 via a point-to-point link.

The second polarizer 340 may be part of the second plate 300. In an exemplary embodiment, the second polarizer 340 may include a plurality of polarization pattern units P1 to Pk extended in the first direction d1, where k is a natural number equal to or larger than one. Although two polarization patterns are grouped into a polarization pattern unit in FIG. 5, this is not limiting. That is, a polarization pattern unit may be defined as two or more polarization patterns.

The display section 110 may further include a plurality of contact areas. In FIG. 5, the plurality of contact areas may include a plurality of left contact areas L1a to Lka disposed on the left side of the second plate 300, and a plurality of right contact areas L1b to Lkb disposed on the right side of the second plate 300. In an exemplary embodiment, the number of the plurality of left contact areas L1a to Lka may be equal to the number of the plurality of right contact areas L1b to Lkb. In addition, the number of each of the plurality of left contact areas L1a to Lka and the plurality of right contact areas L1b to Lkb may be equal to the number of the plurality of polarization pattern units P1 to Pk.

In the following description, the numbers of the plurality of left contact areas L1a to Lka, the plurality of right contact areas L1b to Lkb and the polarization pattern units P1 to Pk all are assumed to be k. The first to $k^{th}$ polarization pattern units P1 to Pk may extend in the first direction d1. The plurality of left contact areas L1a to Lka and the plurality of right contact areas L1b to Lkb may be disposed in a non-display area NPA of the display section 110. The non-display area NPA refers to an area where no image is displayed. In an exemplary embodiment, the non-display area NPA may be disposed on the outer side, e.g., periphery, of the display area where images are displayed.

The first to $k^{th}$ left contact areas L1a to Lka may be connected to the timing controller 140 via a plurality of first sensing lines SL1. The first to $k^{th}$ right contact areas L1b to Lkb may be connected to the timing controller 140 via a plurality of second sensing lines SL2. Alternatively, a single first sensing line SL1 and a single second sensing line SL2 may be used. Alternatively, multiple first sensing lines SL1 and multiple second sensing lines SL2 may be used.

The plurality of left contact areas L1a to Lka may be directly connected to a first end of the second polarizer 340. More specifically, the plurality of left contact areas L1a to Lka may be directly connected to first ends of the first to $k^{th}$ polarization pattern unit P1 to Pk, respectively. For example, the first left contact area L1a may be directly connected to a first end of the first polarization pattern unit P1. The second left contact area L2a may be directly connected to a first end of the second polarization pattern unit P2.

The first to $k^{th}$ left contact areas L1a to Lka may be directly connected to the plurality of sensing lines SL1, respectively. The first to $k^{th}$ left contact areas L1a to Lka may directly connect the plurality of first sensing lines SL1 to the first to $k^{th}$ polarization pattern units P1 to Pk, respectively.

The first to $k^{th}$ right contact areas L1b to Lkb may be directly connected to a second end of the second polarizer 340. More specifically, the first to $k^{th}$ right contact areas L1b to Lkb may be directly connected to the second ends of the first to $k^{th}$ polarization pattern unit P1 to Pk, respectively.

For example, the first right contact area L1b may be directly connected to a second end of the first polarization pattern unit P1. The second right contact area L2b may be directly connected to a second end of the second polarization pattern unit P2. The first and second ends may be spaced apart along the first direction d1.

The first to $k^{th}$ right contact areas L1b to Lkb may be directly connected to the plurality of second sensing lines SL2, respectively. That is, the first to $k^{th}$ right contact areas L1b to Lkb may directly connect the plurality of second sensing lines SL2 to the first to $k^{th}$ polarization pattern units P1 to Pk, respectively.

The locations where the first to $k^{th}$ left contact areas L1a to Lka and the first to $k^{th}$ right contact areas L1b to Lkb are disposed are not particularly limited. For example, the first to $k^{th}$ left contact areas L1a to Lka may be disposed either on the first plate 200 or on the second plate 300, as long as they can directly connect the plurality of first sensing lines SL1 to first ends of the first to $k^{th}$ polarization pattern units P1 to Pk. In addition, the first to $k^{th}$ right contact areas L1b to Lk may be disposed either on the first plate 200 or on the second plate 300, as long as they can directly connect the plurality of second sensing lines SL2 to second ends of the first to $k^{th}$ polarization pattern units P1 to Pk.

In an exemplary embodiment, the plurality of first sensing lines SL1 may be connected to the timing controller 140 via the first source driver DIC1. That is, the plurality of first sensing lines SL1 may be connected to the timing controller 140 by using a plurality of line terminals located at the first source driver DIC1. In an exemplary embodiment, the plurality of second sensing lines SL2 may be connected to the timing controller 140 via the $s^{th}$ source driver DICs. That is, the plurality of second sensing lines SL2 may be connected to the timing controller 140 by using a plurality of line terminals located at the $s^{th}$ source driver DICs. However, this is merely illustrative. The plurality of first sensing lines SL1 and the plurality of second sensing lines SL2 may be connected to the timing controller 140 via source drivers other than the first source driver DIC1 and the $s^{th}$ source driver DICs. In addition, the plurality of first sensing lines SL1 and the plurality of second sensing lines SL2 may be connected to the timing controller 140 independently without using the plurality of source drivers DIC1 to DICs.

The timing controller 140 may measure the resistance of the second polarizer 340 by using the first sensing lines SL1 and the second sensing lines SL2, and may generate a compensation signal based on the measured resistance to provide it to the backlight controller 22. More specifically, the timing controller 140 may include a compensation signal generator 141, a resistance measurer 142, and a memory 143.

The compensation signal generator 141 may apply compensation data received from the resistance measurer 142 to a preset compensation formula. The compensation formula may be set based on luminance data for compensating for degradation of the color conversion layer CC depending on the temperatures and times previously stored in the memory 143. More specifically, the luminance data may be values for compensating for degradation of a wavelength conversion material, e.g., quantum dots, of the color conversion layer CC depending on the temperatures and times. In other words, as the degradation may result in overall dimming of an image output by the display device or may result in dimming of only portions of an image output by the display device, by measuring resistance values of plurality of conductive lines, e.g., the second polarizer 340, that overlap the color conversion layer CC in the third or stacking direction, the compensation signal may be used to control the output of the backlight unit 21 supplying light to the color conversion layer CC accordingly. Therefore, the degradation may be compensated temporally and/or spatially.

That is, the compensation signal generator 141 may generate a compensation signal by applying the compensation data to the compensation formula based on the luminance data. In an exemplary embodiment, the compensation signal may be used to adjust the luminance by varying the duty ratio of the dimming signal DS. The compensation signal generator 141 may provide the generated compensation signal to the backlight control unit 22 via the third control signal CONT3.

The resistance measurer 142 may measure the resistance of the second polarizer 340 via the first sensing lines SL1 and the second sensing lines SL2 to thereby generate the compensation data. The resistance measurer 142 may provide the generated compensation data to the memory 143 or may provide it to the compensation signal generator 141.

The timing controller 140 may further include a controller for controlling the operations of the compensation signal generator 141, the resistance measurer 142, and the memory 143. The controller may control a series of operations performed by the timing controller 140, as well as the operations of the compensation signal generator 141, the resistance measurer 142, and the memory 143.

The backlight controller 22 may generate the dimming signal DS by using the third control signal CONT3 including the compensation signal. The duty ratio of the dimming signal DS may be varied in order to compensate for the degradation of the wavelength conversion material, e.g., quantum dots, included in the color conversion layer CC. The backlight unit 21 may receive the dimming signal DS to control the amount of light. More specifically, the backlight unit 21 may adjust the amount of light according to the received dimming signal DS to compensate for the luminance of the display device that may degrade temporally and/or spatially according to the exemplary embodiment of the present disclosure.

The timing controller 140 may measure the resistance from some portions of the display section 110 and may compensate for the luminance of the some portions based on it. In addition, the timing controller 140 may measure the resistance from the entire the display section 110 and may compensate for the luminance of the entire display section 110 based on it.

Figure 6:
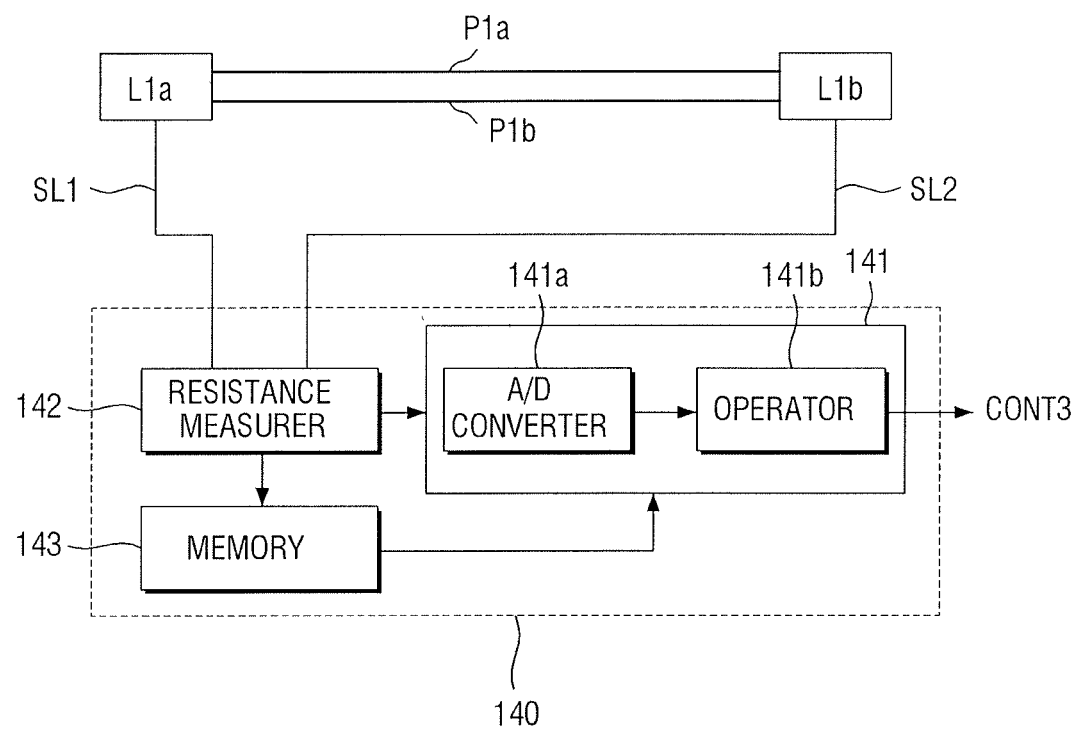
FIG. 6 illustrates a diagram of a process of generating a compensation signal in operation of the display device of FIG. 5.
Figure 7:
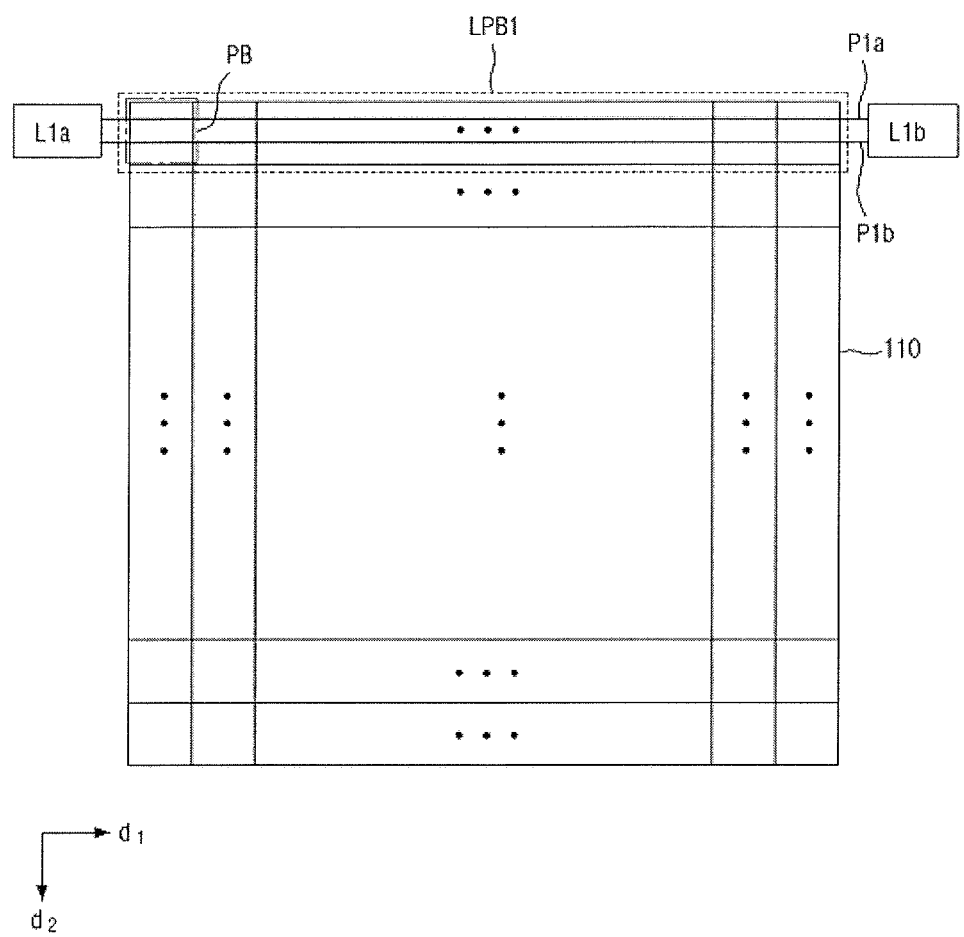
FIGS. 7 and 8 illustrate diagrams of a method of compensating for the luminance of a display section in the operation of the display device of FIG. 5.
Figure 8:
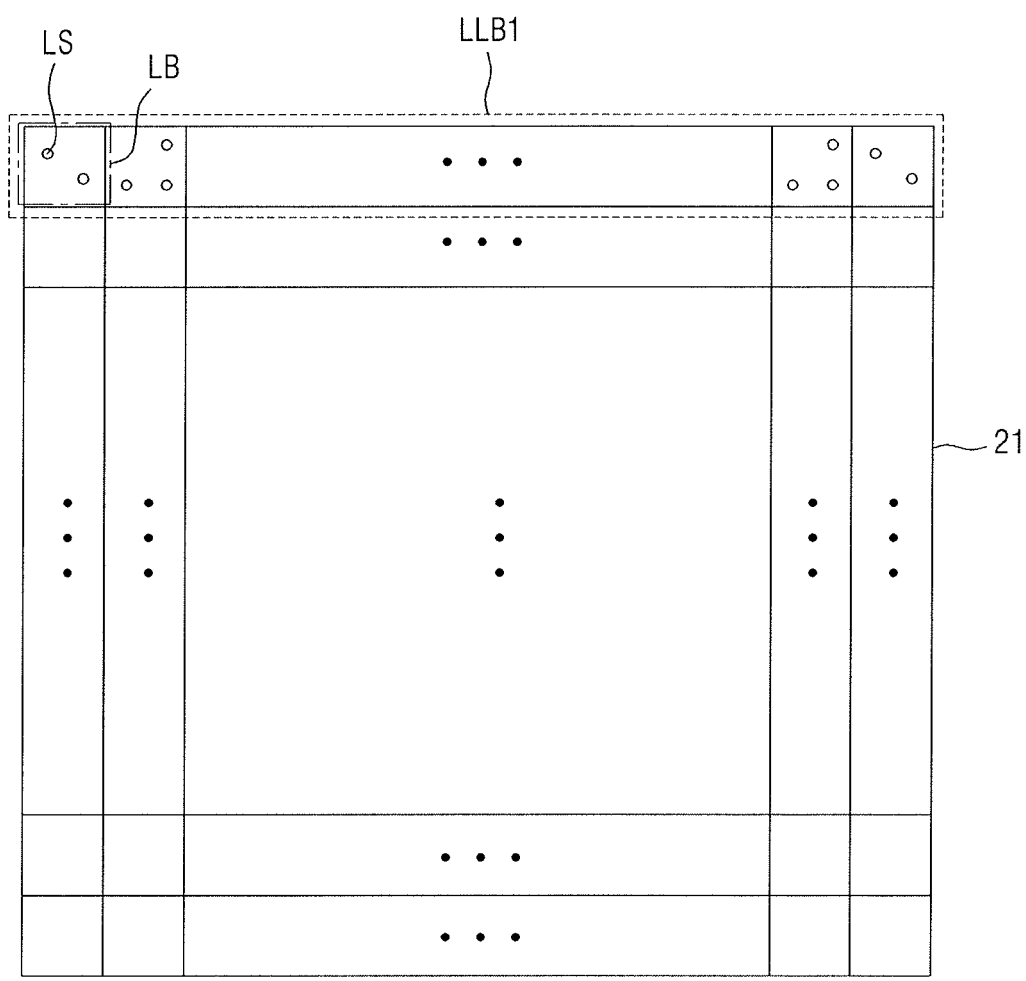

Hereinafter, a method for compensating for the luminance of some portions will be described with referring to FIGS. 6 to 8. FIG. 6 is a diagram for illustrating a process of generating a compensation signal in operation of the display device of FIG. 5. FIGS. 7 and 8 are diagrams for illustrating a method of compensating for the luminance of a display section in the operation of the display device of FIG. 5. Descriptions will be made with respect to the first left contact area L1a, the right contact area L1b, and a first polarization pattern unit P1 connected thereto. In an exemplary embodiment, the first polarization pattern unit P1 may include a first polarization pattern P1a and a second polarization pattern P1b. It is to be noted that the first polarization pattern unit P1 may include a plurality of polarization patterns.

Referring to FIGS. 5 to 7, the resistance measurer 142 may provide a predetermined voltage to the first sensing line SL1 among the plurality of first sensing lines SL1 that is in contact with the first left contact area L1a. The predetermined voltage may be applied to the first polarization pattern unit P1 via the first left contact area L1a, and then to the second sensing line SL2 via the first right contact area L1b. The voltage applied to the second sensing line SL2 may be applied back to the resistance measurer 142. The display section 110 may include a first display area LPB1 corresponding to the first polarization pattern unit P1. The first display area LPB1 may be divided into a plurality of display blocks PB, each of which may include a plurality of pixels. The number of the plurality of pixels included in the display blocks PB may vary depending on the arrangement and size of the second polarizer 340, the shape and size of light source blocks LB included in the backlight unit 21, etc. (see FIG. 8).

The first polarization pattern unit P1 corresponding to the first area LPB1 may be affected by a change in temperature of the display device according to the exemplary embodiment of the present disclosure. This may become severe over time and, in turn, the first polarization pattern unit P1 may be affected. Accordingly, the voltage applied via the first sensing line SL1 may be applied to the second sensing line SL2 via the first polarization pattern unit P1. Thus, the level of the voltage applied to the first sensing line SL1 may be different from the level of the voltage applied to the second sensing line SL2 if the first polarization pattern unit P1 is affected by a change in temperature of the display device.

Accordingly, the resistance measurer 142 may generate compensation data based on the different between the voltage levels and may provide the generated compensation data to the compensation signal generator 141. The compensation signal generator 141 may apply the received compensation data to a compensation formula previously calculated based on the temperatures and times, to generate a compensation signal. In an exemplary embodiment, the compensation data may be an analog signal.

The compensation signal generator 141 may further include an A/D converter 141a and an operator 141b. The A/D converter 141a may receive compensation data in the form of an analog signal from the resistance measurer 142 and convert it into a digital signal. When the compensation data received from the resistance measurer 142 is a digital signal, the A/D converter 141a may be omitted. The compensation signal generator 141b may generate a compensation signal by applying the compensation data in the form of a digital signal to the compensation formula previously stored in the memory 143. The timing controller 140 may output the generated compensation signal to the backlight controller 22 via the third control signal CONT3.

The resistance measurer 142 may provide the generated compensation data to the memory 143. The compensation data provided to the memory 143 may be stored in the memory 143, such that it may be used as basic data for calculating the compensation formula.

The resistance measurer 142 may provide a predetermined voltage to the second sensing line SL2, such that the level of the provided voltage may be compared with the level of the voltage provided back to the first sensing line SL1. The resistance measurer 142 may not necessarily use voltage value to generate the compensation data, but may generate the compensation data by using a current value.

The backlight controller 22 may vary the duty ratio of the dimming signal DS based on the third control signal CONT3 to compensate for luminance deviations. The backlight controller 22 may provide the dimming signal DS with varied duty ratio to the backlight unit 21.

The backlight unit 21 may adjust the amount of light according to the dimming signal DS with varied duty ratio. Referring to FIG. 8, the backlight unit 21 may include a first light source area LLB1 corresponding to the first display area LPB1 of the display section 110. The first light source area LLB1 may include a plurality of light source blocks LB, and each of the light source blocks LB may include at least one light source element LS.

The backlight unit 21 may control the duty ratio of the light source element LS included in each of the light source blocks LB according to the received dimming signal DS to thereby adjust the amount of light emitted from the first light source area LLB1. By doing so, the display device according to the exemplary embodiment may compensate for the luminance deviations in the first display area LPB1.

That is, some of the plurality of pixels included in the display blocks PB may include a wavelength conversion material, e.g., quantum dots, which may be degraded as the temperature changes and the time elapses. Such degradation may cause the luminance deviations throughout the display device. By monitoring the effect of temperature and time on the first polarization pattern units by measuring the voltages transmitted thereby, the effect on the wavelength conversion material may be determined, and the back light unit may be controlled to compensate for associated luminance deviations.

In view of the above, the display device according to the exemplary embodiment of the present disclosure may measure the degree of the degradation of the wavelength conversion material, e.g., quantum dots, from the resistance of the second polarizer 340 and may vary the duty ratio of the dimming signal DS to compensate for the luminance deviations. The timing controller 140 may adjust the luminance of some portions of the display section 110 rather than the entire display device 110.

Referring to FIG. 5, the resistance measurer 142 may apply a predetermined voltage to all of the plurality of first sensing lines SL1. The predetermined voltage may be applied to the first to $k^{th}$ polarization pattern units P1 to Pk via the first to $k^{th}$ left contact areas L1a to Lka, and then to the plurality of second sensing lines SL2 via the first to $k^{th}$ right contact areas L1b to Lkb, respectively. The voltage applied to the second sensing lines SL2 may be applied back to the resistance measurer 142. The resistance measurer 142 may compare the level of the voltage applied to the plurality of first sensing lines SL1 with the level of the voltage received from the plurality of second sensing lines SL2 and may measure the resistance of the first to $k^{th}$ polarization pattern units P1 to Pk to generate the compensation data.

Figure 9:
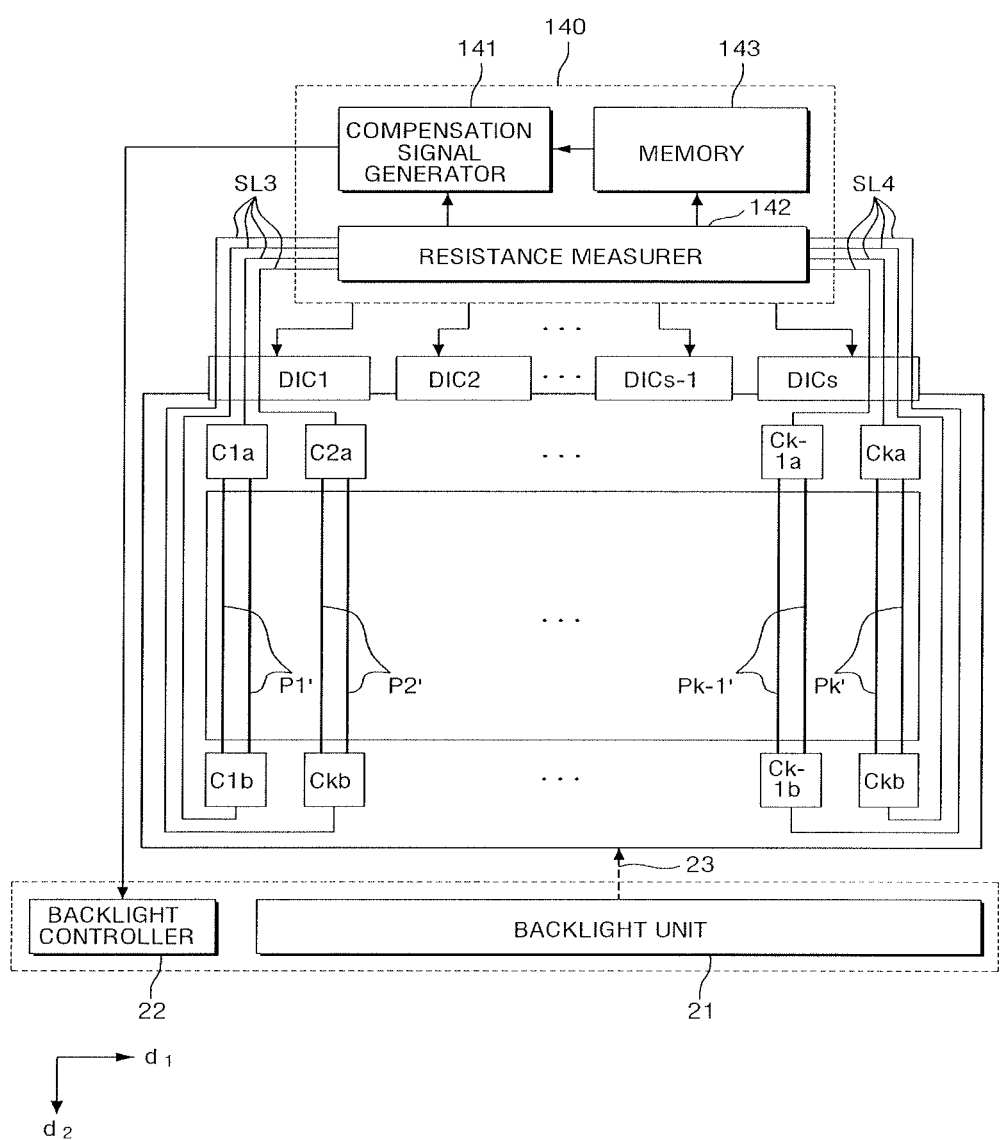
FIGS. 9 and 10 illustrate diagrams of operation of a display device according to another exemplary embodiment of the present disclosure.
Figure 10:
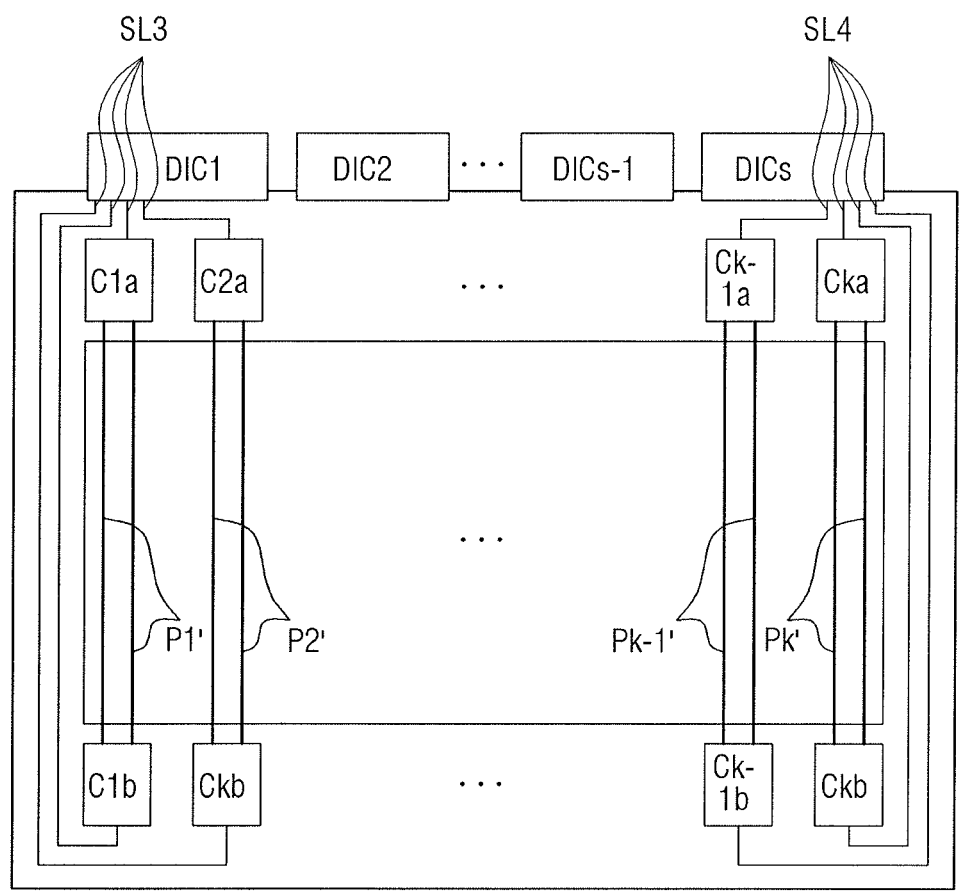
Figure 11:
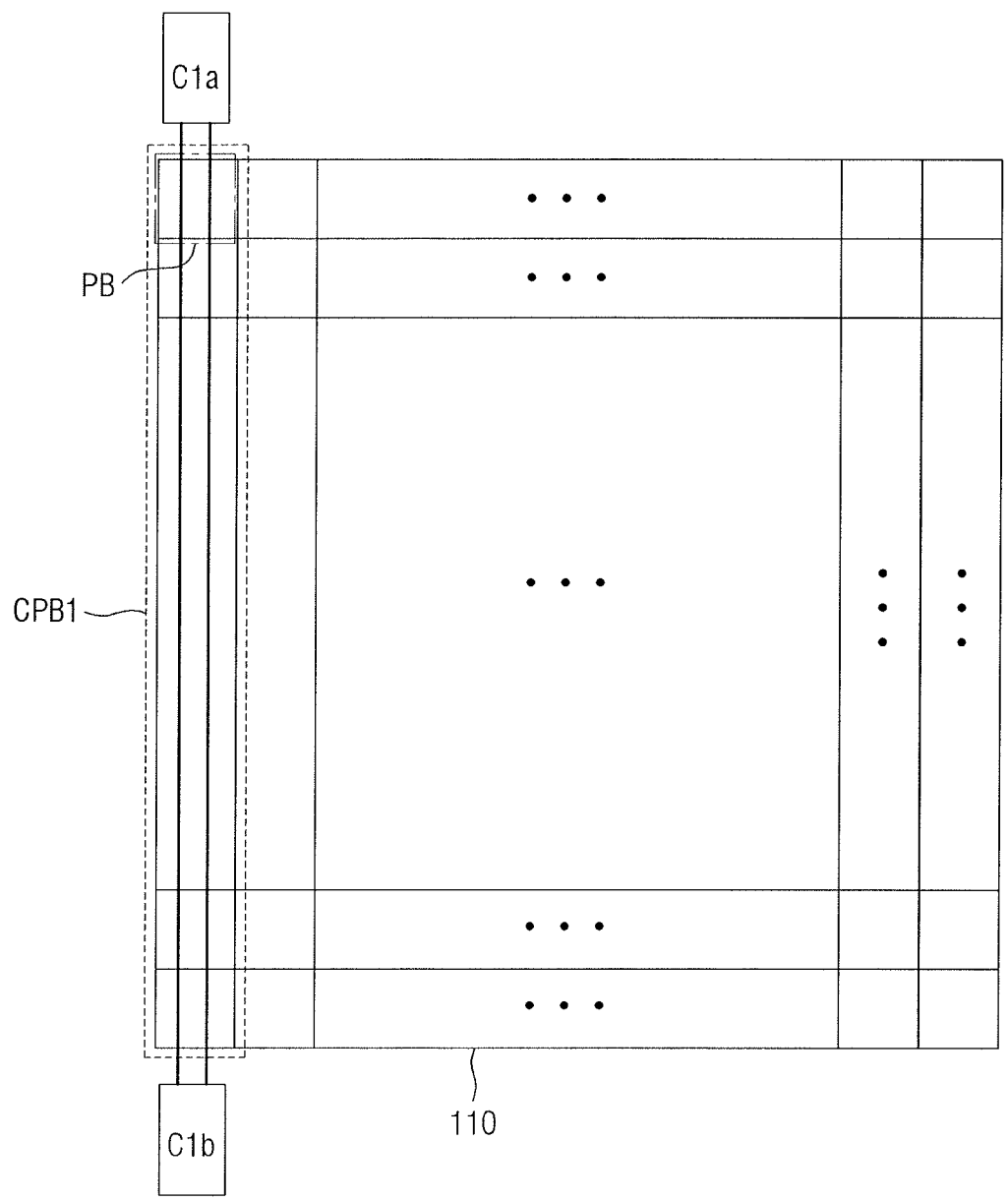
FIGS. 11 and 12 illustrate diagrams of a method of compensating for luminance of a display section in operation of the display device of FIG. 9.
Figure 12:
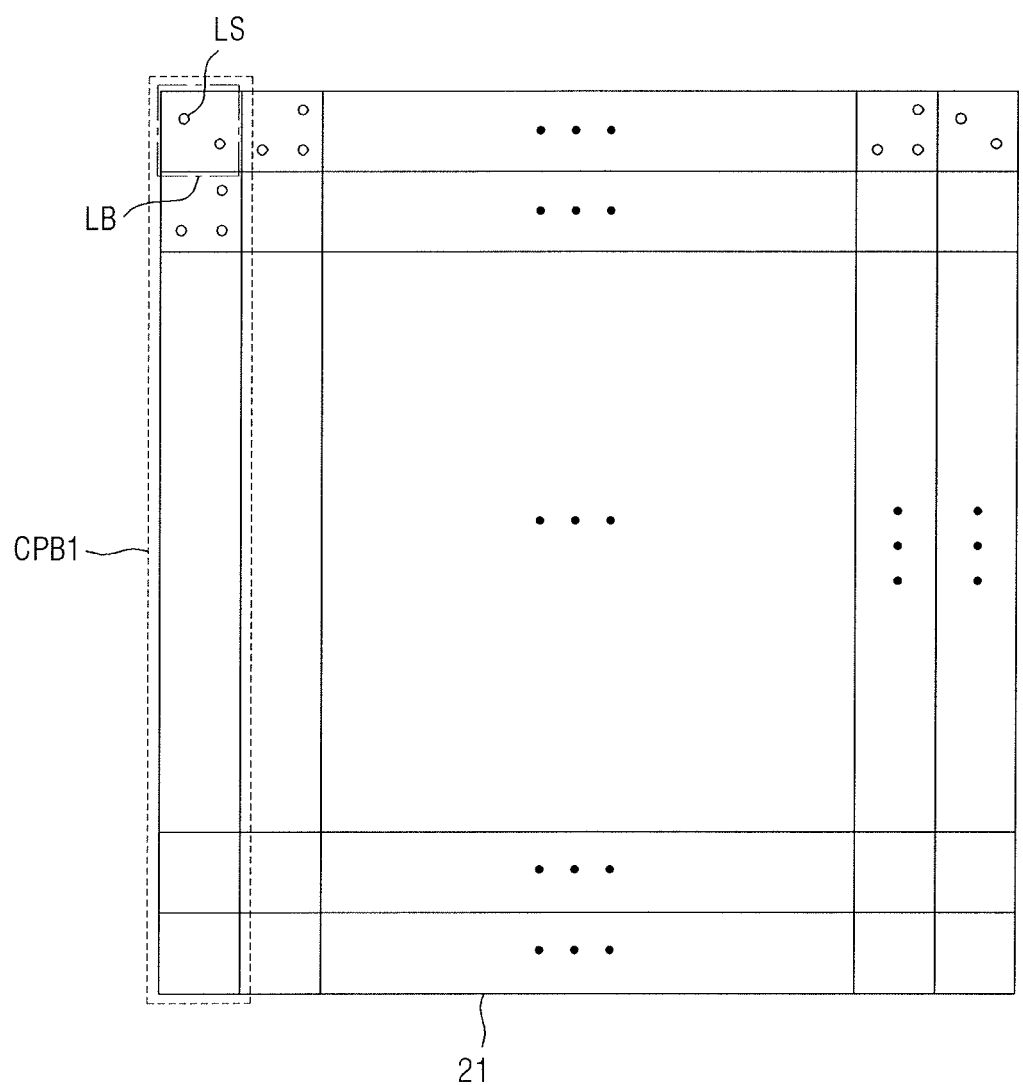

FIGS. 9 and 10 are diagrams for illustrating operation of a display device according to another exemplary embodiment of the present disclosure. FIGS. 11 and 12 are diagrams for illustrating a method of compensating for luminance of a display section in operation of the display device of FIG. 9. The elements already described above with respect to FIGS. 1 to 8 will not be described again.

The second polarizer 340 may include a plurality of metal wire patterns extended in the second direction d2 and having a grid pattern. Accordingly, the first to $k^{th}$ polarization pattern units P1' to Pk' may extend in the second direction d2. In FIG. 11, the plurality of contact areas may include a plurality of upper contact areas C1a to Cka disposed on the upper side of the display section 110, and a plurality of lower contact areas C1b to Ckb disposed on the lower side of the display section 110.

In an exemplary embodiment, the number of the plurality of upper contact areas C1a to Cka may be equal to the number of the plurality of lower contact areas C1b to Ckb. In addition, the number of each of the plurality of lower contact areas C1b to Ckb and the plurality of upper contact areas C1a to Cka may be equal to the number of the plurality of polarization pattern units P1' to Pk'. In the following description, the numbers of the plurality of upper contact areas C1a to Cka, the plurality of lower contact areas C1b to Ckb and the polarization pattern units P1' to Pk' all are assumed as k.

The first to $k^{th}$ upper contact areas C1a to Cka may be connected to the resistance measurer 142 of the timing controller 140 via a plurality of third sensing lines SL3. The first to $k^{th}$ lower contact areas C1b to Ckb may be connected to the resistance measurer 142 of the timing controller 140 via a plurality of fourth sensing lines SL4.

The first to $k^{th}$ upper contact areas C1a to Cka may directly connect the plurality of third sensing lines SL3 to the first to $k^{th}$ polarization pattern units P1' to Pk', respectively. The first to $k^{th}$ lower contact areas C1b to Ckb may directly connect the plurality of fourth sensing lines SL4 to the first to $k^{th}$ polarization pattern units P1' to Pk', respectively. The location of the plurality of contact areas and the arrangement of the plurality of sensing lines may vary depending on the direction in which the plurality of polarization pattern units extend.

Accordingly, referring to FIGS. 11 and 12, the timing controller 140 may measure the resistance of a second display area CPB1 of the display section 110 and may generate a compensation signal based on the measured resistance to provide it to the backlight control unit 22. The backlight controller 22 may vary the duty ratio of the dimming signal DS based on the provided compensation signal to provide it to the backlight unit 21. The backlight unit 21 may adjust the amount of light emitted from the second light source area CLB1 corresponding to the second display area CPB1. By doing so, the display device according to this exemplary embodiment of the present disclosure may compensate for the luminance deviations in the second display area CPB1.

Figure 13:
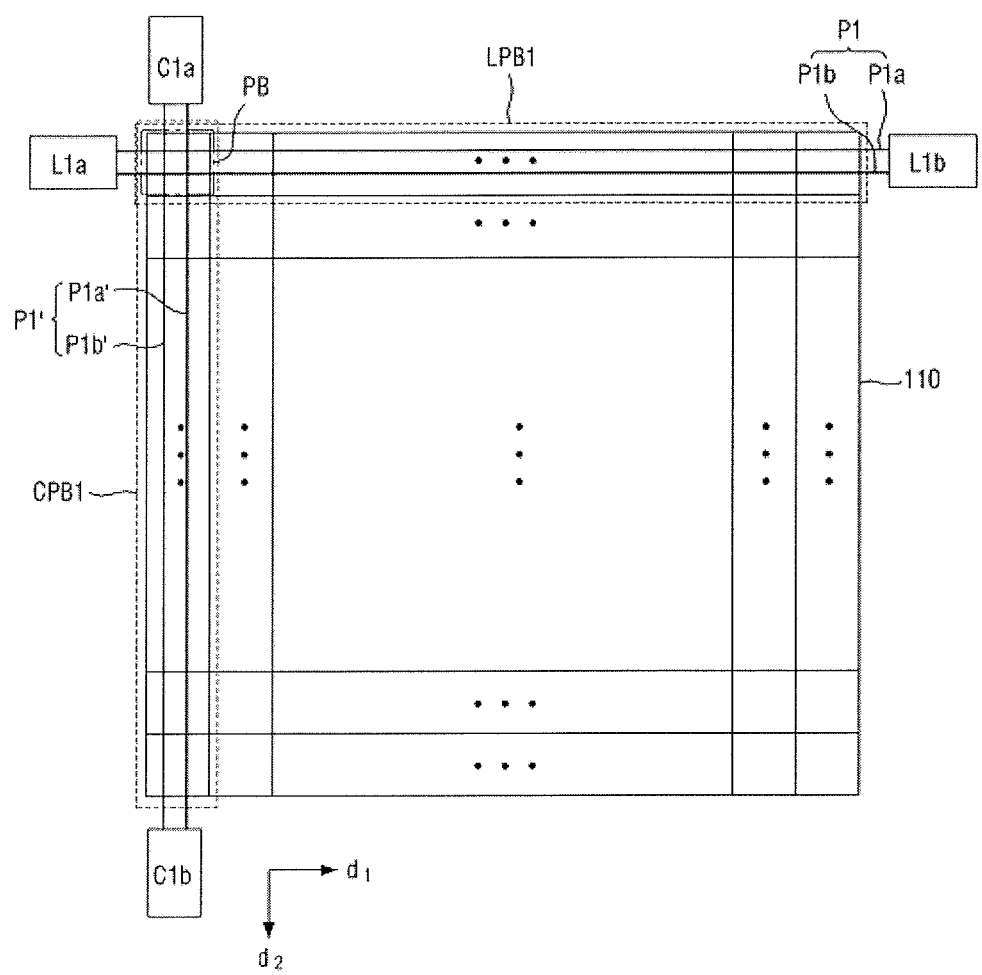
FIGS. 13 and 14 illustrate diagrams of a method of compensating for luminance of a display section in operation of a display device according to yet another exemplary embodiment of the present disclosure.
Figure 14:
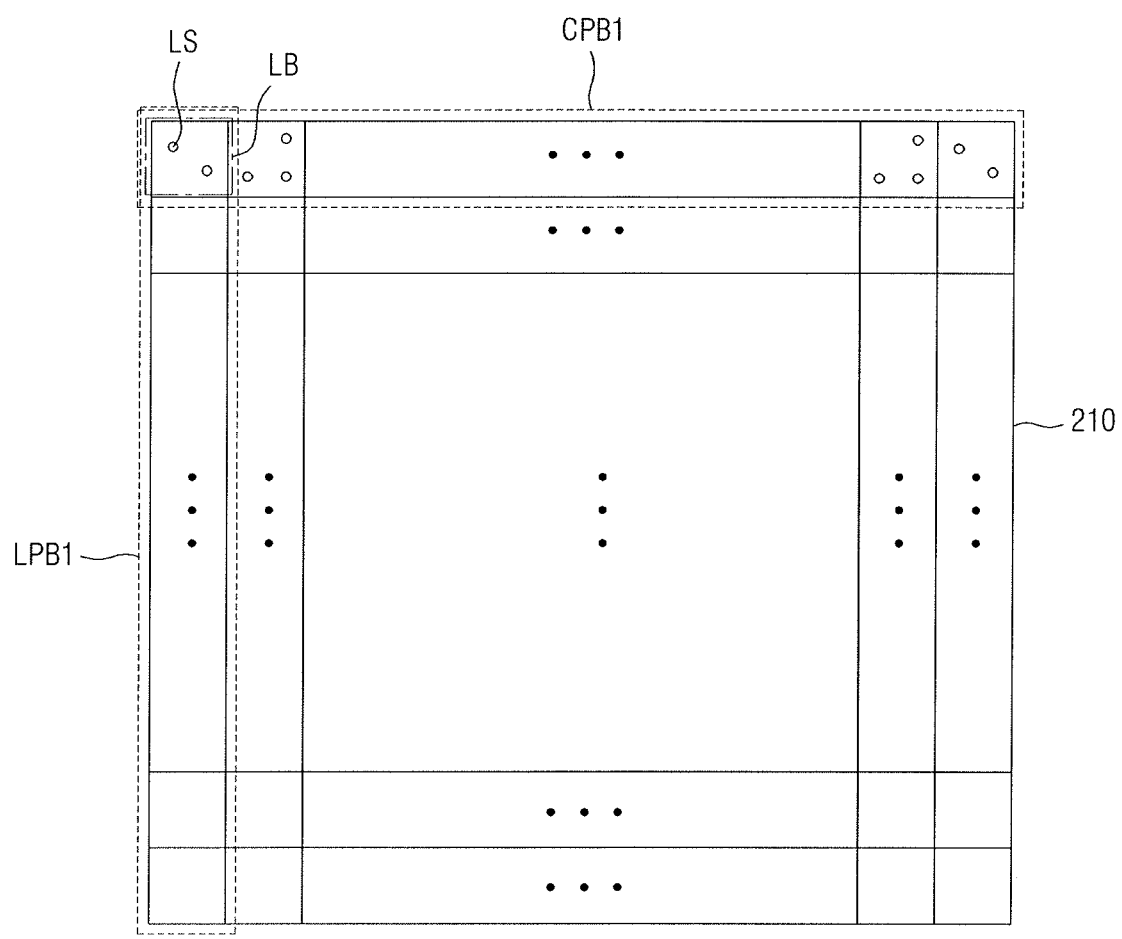

FIGS. 13 and 14 are diagrams for illustrating a method of compensating for luminance of a display section in operation of a display device according to yet another exemplary embodiment of the present disclosure. The elements already described above with respect to FIGS. 1 to 12 will not be described again.

The second polarizer 340 may include a plurality of metal wire patterns extended in the first direction d1 and having a grid pattern. In an exemplary embodiment, the first polarizer 240 may be a wire grid polarizer. The first polarizer 240 may include a plurality of metal wire patterns, and the plurality of metal wire patterns of the first polarizer 240 may have a grid pattern extended in the second direction d2. That is, in the display device according to yet another exemplary embodiment of the present disclosure, both of the first and second polarizers 240 and 340 may be wire grid polarizers. It is to be noted that the directions in which the grids of the plurality of metal wire patterns included in the first and second polarizers 240 and 340 extend may intersect each other.

Accordingly, the first to $k^{th}$ polarization pattern units P1 to Pk may extend the first direction d1, while the first to $k^{th}$ polarization pattern units P1' to Pk' may extend in the second direction d2. Alternatively, the directions in which the wire patterns extend in the first and second polarizers 240 and 340 may be switched.

In FIG. 13, the plurality of contact areas may include a plurality of left contact areas L1a to L1k disposed on the left side of the display section 110, a plurality of right contact areas L1b to L1k disposed on the right side of the display section 110, a plurality of upper contact areas C1a to Cka disposed on the upper side of the display section 110, and a plurality of lower contact areas C1b to Ckb disposed on the lower side of the second plate 300.

In an exemplary embodiment, the number of the plurality of left contact areas L1a to Lka may be equal to the number of the plurality of right contact areas L1b to Lkb. In addition, the number of each of the plurality of left contact areas L1a to Lka and the plurality of right contact areas L1b to Lkb may be equal to the number of the plurality of polarization pattern units P1 to Pk.

In an exemplary embodiment, the number of the plurality of upper contact areas C1a to Cka may be equal to the number of the plurality of lower contact areas C1b to Ckb. In addition, the number of each of the plurality of upper contact areas C1a to Cka and the plurality of lower contact areas C1b to Ckb may be equal to the number of the plurality of polarization pattern units P1' to Pk'.

In the following description, the numbers of the plurality of left contact areas L1a to Lka, the plurality of right contact areas L1b to Lkb, the polarization pattern units P1 to Pk, the plurality of upper contact areas C1a to Cka, the plurality of lower contact areas C1b to Ckb, and the plurality of polarization pattern units P1' to Pk' all are assumed as k. However, this is not limiting. The numbers of the plurality of left contact areas L1a to Lka and the plurality of right contact areas L1b to Lkb may differ from the numbers of the plurality of upper contact areas C1a to Cka and the plurality of lower contact areas C1b to Ckb.

According to this exemplary embodiment of the present disclosure, the display device includes the plurality of left contact areas L1a to Lka and the plurality of right contact areas L1b to Lkb connected to the plurality of polarization pattern units P1 to Pk, and the plurality of upper contact areas C1a to Cka and the plurality of lower contact areas C1b to Ckb connected to the plurality of polarization pattern units P1' to Pk', such that the display area of the display section 110 can be divided more precisely to thereby compensate for luminance deviations between different areas.

That is, the timing controller 140 may measure only the resistance of the display blocks PB overlapping between the first display area LPB1 and the second display area CPB1 and may generate a compensate signal based on it. The backlight controller 22 may vary the duty ratio of the dimming signal DS based on the provided compensation signal to provide it to the backlight unit 21. The backlight unit 21 may adjust the amount of light emitted from the light source blocks SB corresponding to the display blocks PB. By doing so, the display device according to this exemplary embodiment of the present disclosure can compensate for the luminance deviations by dividing the display section 110 more precisely.

Figure 15:
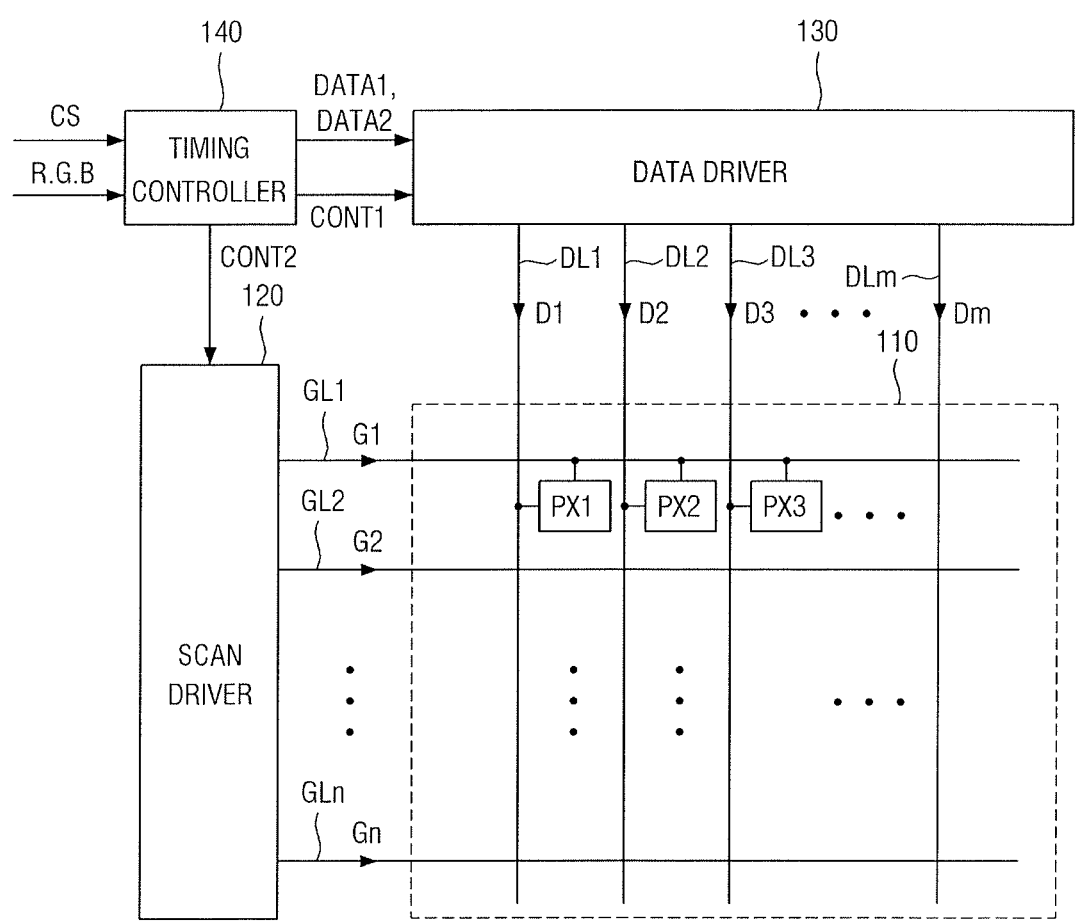
FIG. 15 illustrates a block diagram of a display device according to another exemplary embodiment of the present disclosure.
Figure 15:
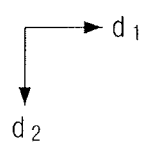

FIG. 15 is a block diagram of a display device according to another exemplary embodiment of the present disclosure. The elements already described above with respect to FIGS. 1 to 14 will not be described again.

Referring to FIG. 15, the timing controller 140 may provide first image data DATA1 and second image data DATA2 to the data driver 120. The first image data DATA1 and the second image data DATA2 may be required by the display section 110 to display images. The first image data DATA1 may be image data before correction, while the second image data DATA2 may be image data after correction.

The timing controller 140 may measure the resistance of the second polarizer 340 (see FIG. 4) and may generate a compensation signal based on the measured resistance. The timing controller 140 may correct the first image data DATA1 by using the generated compensation signal to generate the second image data DATA2 and may provide it to the data driver 120.

The data driver 120 may receive the second image data DATA2 and may correct the first to $m^{th}$ data signal D1 to Dm based on the received second image data DATA2 to provide it to the display section 110. That is, the display device according to this exemplary embodiment of the present disclosure may receive the corrected image signal to compensate for luminance deviations.

Figure 16:
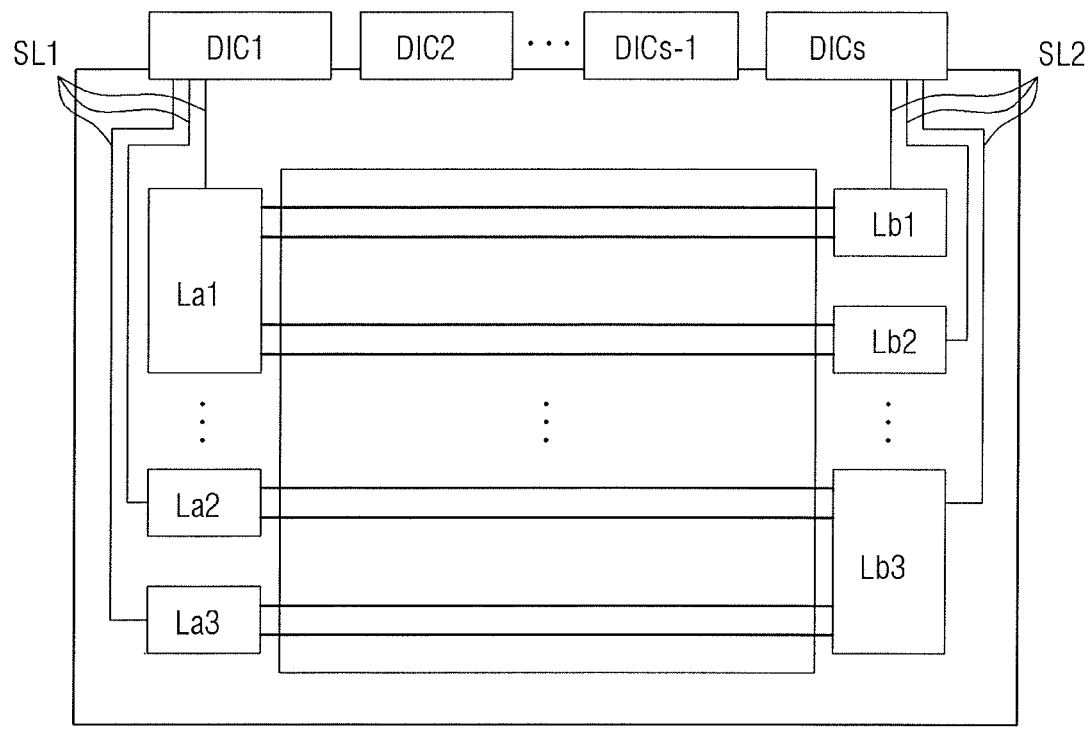
FIGS. 16 and 17 illustrate diagrams of a method of measuring a resistance of a display device according to another exemplary embodiment of the present disclosure.
Figure 17:
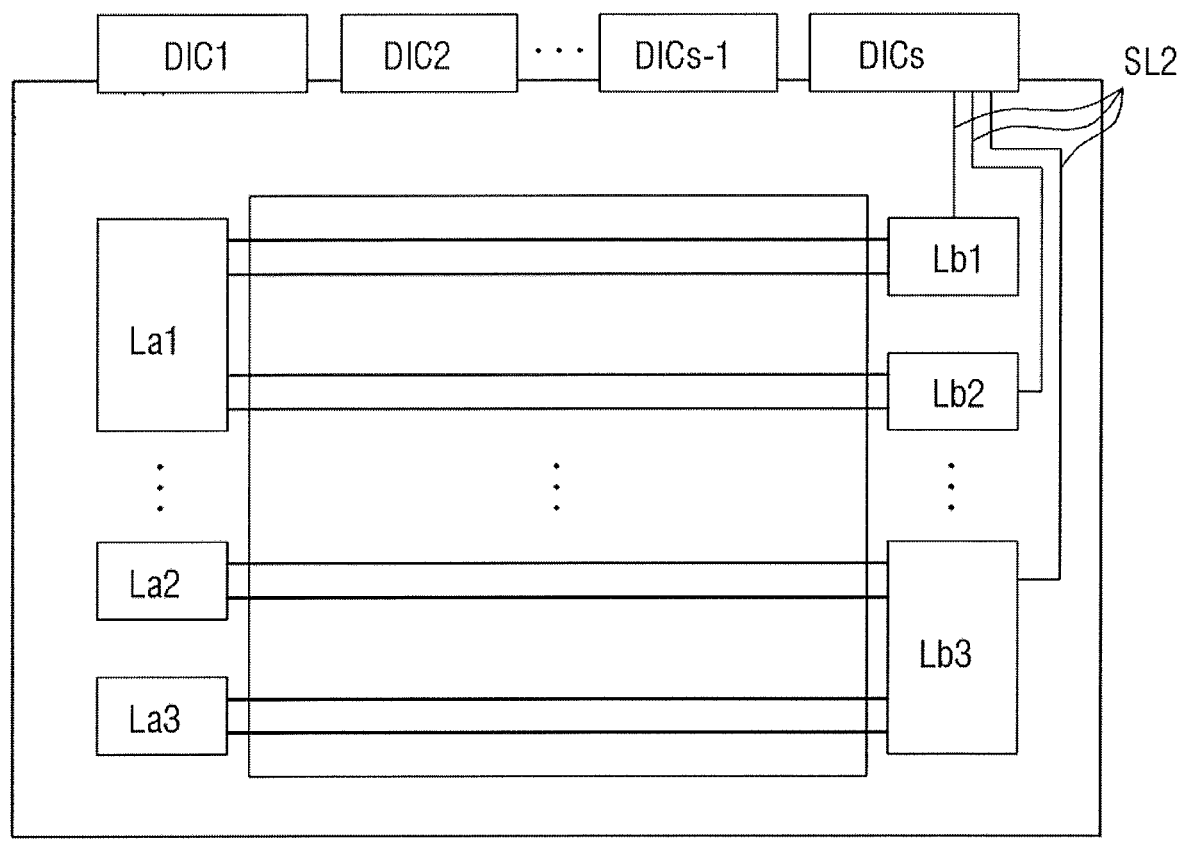

FIGS. 16 and 17 are diagrams for illustrating a method of measuring a resistance of a display device according to another exemplary embodiment of the present disclosure. The elements already described above with respect to FIGS. 1 to 15 will not be described again. It is to be noted that the relationship between the first and second sensing lines and the timing controller 140 are not depicted in FIGS. 16 and 17.

Referring to FIG. 16, the display section 110 may include a plurality of left contact areas La1 to La3 connected to a plurality of first sensing lines SL1, respectively, and a plurality of right contact areas Lb1 to Lb3 connected to a plurality of second sensing lines SL2, respectively. The number of each of the plurality of left contact areas La1 and La3 and the plurality of right contact areas Lb1 to Lb3 may vary depending on the size of the display section 110, the size of the second polarizer 340, etc.

The first left contact area La1 may be associated with the first and second right contact areas Lb1 and Lb2. The first left contact area La1 may be connected to the first and second right contact areas Lb1 and Lb2 via a plurality of polarization pattern units. That is, the first left contact area La1 may be connected to more polarization pattern units than the first right contact Lb1 is.

Alternatively, the second and third left contact areas La2 and La3 may be associated with the third right contact area Lb3. The second and third left contact areas La2 and La3 may be connected to the third right contact area Lb3 via a plurality of polarization pattern units. That is, the third right contact area La3 may be connected to more polarization pattern units than the second and third left contact areas La2 and La3 are. In addition, the arrangement of the plurality of left contact areas La1 to La3 and the plurality of right contact areas Lb1 to Lb3 is not limited to that shown in FIG. 16.

Referring to FIG. 17, the plurality of left contact areas La1 to La3 is not connected to any sensing line. Only the plurality of right contact areas Lb1 to Lb3 may be connected to the plurality of second sensing lines SL2. That is, not all of the contact areas have to be connected to the sensing lines, and the connection with the sensing lines may vary as long as the resistance can be measured via the second polarizer 340.

The controllers and other processing features of the embodiments described herein may be implemented in logic, which, for example, may include hardware, software, or both. When implemented at least partially in hardware, the controllers and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Operations of the method embodiments may transform the computer, processor, controller, or other signal processing device into a special-purpose processor for performing the methods described herein.

By way of summation and review, one or embodiments may provide a display device capable of compensating for a decrease in luminance, either spatially and/or temporally, of the display device caused by degradation of wavelength conversion material. In particular, one or more embodiments may measure a change in resistance in a line corresponding to a particular region of the display device and may compensate for an attendant degradation of wavelength conversion material in accordance with the change in resistance such that luminance of the display device may remain uniform spatially and/or temporally.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
a first substrate;
a color conversion layer on the first substrate and including a wavelength conversion material;
a first conductive polarizer on the color conversion layer; and
a timing controller electrically connected to the first conductive polarizer, the timing controller measuring a resistance of the first conductive polarizer to generate a compensation signal based on the measured resistance.

2. The display device as claimed in claim 1, further comprising:
a backlight to provide light to the color conversion layer; and
a backlight controller to provide a dimming signal to the backlight,
wherein the timing controller provides the compensation signal to the backlight controller.

3. The display device as claimed in claim 2, wherein the backlight controller adjusts a duty ratio of the dimming signal based on the compensation signal.

4. The display device as claimed in claim 2, further comprising:
a second substrate facing the first substrate and having a display area,
wherein the backlight includes a light source area corresponding to the display area.

5. The display device as claimed in claim 4, wherein:
the timing controller measures a resistance of at least some portions of the display area to generate the compensation signal based on the measured resistance, and
the backlight receives the dimming signal generated based on the compensation signal from the backlight controller and adjusts an amount of light provided to a portion of the light source area that corresponds to the at least some portions of the display area.

6. The display device as claimed in claim 1, wherein:
the first conductive polarizer includes a plurality of first polarization pattern units extending in a first direction, and
the timing controller is connected to one end or both ends of the plurality of first polarization pattern units by a plurality of first sensing lines.

7. The display device as claimed in claim 6, further comprising:
a second conductive polarizer including a plurality of second polarization pattern units extending in a second direction different from the first direction, and
a plurality of second sensing lines that connect the timing controller to one end or both ends of the plurality of second polarization pattern units.

8. The display device as claimed in claim 7, further comprising:
a second substrate facing the first substrate,
wherein the second conductive polarizer is on or under the second substrate.

9. The display device as claimed in claim 1, wherein the timing controller includes:
a resistance measurer that measures the resistance of the first conductive polarizer, and
a compensation signal generator that generates the compensation signal based on the measured resistance.

10. The display device as claimed in claim 9, wherein:
the timing controller further includes a memory that stores a preset compensation formula therein, and
the compensation signal generator supplies the measured resistance to the compensation formula to generate the compensation signal.

11. The display device as claimed in claim 1, further comprising:
a data driver electrically connected to the timing controller,
wherein the timing controller uses the compensation signal to correct image data and to provide the corrected image data to the data driver.

12. A display device, comprising:
a first substrate including a display area and a non-display area outside the display area;
a timing controller in the non-display area;
a second substrate facing the first substrate;
a color conversion layer including a wavelength conversion material; and
a first conductive polarizer on the color conversion layer and electrically connected to the timing controller,
wherein the timing controller measures a resistance of the first conductive polarizer and generates a compensation signal based on the measured resistance.

13. The display device as claimed in claim 12, further comprising:
a first pixel, a second pixel, and a third pixel in the display area,
wherein the color conversion layer includes a first wavelength conversion layer overlapping the first pixel and a second wavelength conversion layer overlapping the second pixel, and
wherein the first wavelength conversion layer and the second wavelength conversion layer include the wavelength conversion material.

14. The display device as claimed in claim 13, wherein the color conversion layer further includes a transparent layer overlapping the third pixel and in a same layer as the first wavelength conversion layer and the second wavelength conversion layer.

15. The display device as claimed in claim 12, further comprising:
   a backlight to provide light to the color conversion layer; and
   a backlight controller to provide a dimming signal to the backlight,
   wherein the timing controller provides the compensation signal to the backlight controller, and
   wherein the backlight controller adjusts a duty ratio of the dimming signal based on the compensation signal.

16. The display device as claimed in claim 15, wherein:
   the backlight includes a light source area corresponding to the display area,
   the timing controller measures a resistance of at least some portions of the display area to generate the compensation signal based on the measured resistance, and
   the backlight controller generates the dimming signal based on the compensation signal.

17. The display device as claimed in claim 12, wherein:
   the first conductive polarizer includes a plurality of first polarization pattern units extending in a first direction, and
   the timing controller is connected to one end or both ends of the plurality of first polarization pattern by a plurality of first sensing lines.

18. The display device as claimed in claim 17, further comprising:
   a second conductive polarizer including a plurality of second polarization pattern units extending in a second direction different from the first direction,
   wherein the timing controller is connected to one end or both ends of the plurality of second polarization pattern units by a plurality of second sensing lines.

19. The display device as claimed in claim 12, wherein the timing controller further includes:
   a resistance measurer to measure a resistance of the first conductive polarizer,
   a compensation signal generator to generate the compensation signal based on the measured resistance, and
   a memory to store a preset compensation formula,
   wherein the compensation signal generator applies the measured resistance to the compensation formula to generate the compensation signal.

20. The display device as claimed in claim 12, further comprising:
   data lines; and
   a data driver to provide data signals to the data lines based on image data received from the timing controller,
   wherein the timing controller uses the compensation signal to correct the image data and provides the corrected image data to the data driver.

21. A device, comprising:
   a first substrate;
   a color conversion layer on the first substrate and including a wavelength conversion material;
   conductive lines overlapping the color conversion layer;
   a timing controller electrically connected to the conductive lines to measure a resistance of the conductive lines to generate a compensation signal based on the measured resistance;
   a light source to provide light to the color conversion layer; and
   a light source controller to provide a dimming signal to the light source,
   wherein the timing controller provides the compensation signal to the light source controller, and
   wherein the light source controller adjusts an amount of light output by the light source based on the compensation signal.

22. The device as claimed in claim 21, wherein the conductive lines serve as a polarizer.

* * * * *